United States Patent
Liu et al.

(10) Patent No.: US 12,328,773 B2
(45) Date of Patent: Jun. 10, 2025

(54) CONFIGURATIONS FOR NARROWBAND WIRELESS COMMUNICATION

(71) Applicant: QUALCOMM Incorporated, San Diego, CA (US)

(72) Inventors: Le Liu, San Jose, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/564,835

(22) Filed: Dec. 29, 2021

(65) Prior Publication Data

US 2022/0248474 A1 Aug. 4, 2022

Related U.S. Application Data

(60) Provisional application No. 63/143,419, filed on Jan. 29, 2021.

(51) Int. Cl.
| | | |
|---|---|---|
| *H04W 74/08* | (2024.01) | |
| *H04L 1/1812* | (2023.01) | |
| *H04L 5/00* | (2006.01) | |
| *H04W 72/04* | (2023.01) | |
| *H04W 72/044* | (2023.01) | |
| *H04W 74/0833* | (2024.01) | |

(52) U.S. Cl.
CPC ....... *H04W 74/0841* (2013.01); *H04L 1/1812* (2013.01); *H04L 5/0012* (2013.01); *H04L 5/0051* (2013.01); *H04W 72/044* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2014/0050206 A1* | 2/2014 | Seo | H04J 11/0069 370/336 |
| 2019/0109750 A1* | 4/2019 | Nam | H04L 27/2613 |
| 2019/0159258 A1* | 5/2019 | Islam | H04W 74/0833 |

(Continued)

FOREIGN PATENT DOCUMENTS

| | | | | |
|---|---|---|---|---|
| CN | 113873644 A | * | 12/2021 | ....... H04L 27/26025 |
| WO | WO-2020204792 A1 | * | 10/2020 | ........ H04W 56/0045 |

OTHER PUBLICATIONS

International Search Report and Written Opinion—PCT/US2021/065774—ISA/EPO—May 2, 2022.

(Continued)

*Primary Examiner* — Yemane Mesfin
*Assistant Examiner* — Jeff Banthrongsack
(74) *Attorney, Agent, or Firm* — Loza & Loza LLP

(57) ABSTRACT

Aspects relate to one or more configurations for wireless communication via a radio frequency (RF) band. A user equipment (UE) and a base station (BS) may support communication on a first RF band. A first minimum bandwidth size may be defined for first RF band. The first minimum bandwidth size may be smaller than a second minimum bandwidth size defined for a second RF band available to the UE. The UE and the BS may each communicate via the first RF band according to a first configuration that is based on the first minimum bandwidth size.

29 Claims, 23 Drawing Sheets

(56) References Cited

U.S. PATENT DOCUMENTS

2019/0208464 A1* 7/2019 Lee .................. H04W 48/20
2019/0230529 A1* 7/2019 Sadiq ................ H04W 24/04

OTHER PUBLICATIONS

Nokia Germany: "Nokia comments on RT (19) 07402 9", ETSI Draft, RT (19) 000033, European Telecommunications Standards Institute (ETSI), 650, Route Des Lucioles, F-06921 Sophia-Antipolis, France, vol. TC RT Railway Telecommunications, Aug. 22, 2019 (Aug. 22, 2019), XP014354586, pp. 1-2, Retrieved from the Internet: URL: docbox.etsi.org/RT/RT/05-Contributions/2019/RT(19)000033_Nokia_comments_on_RT_19_074029.docx [retrieved on Aug. 22, 2019] The Whole Document.

"Rail Telecommunications (RT), Next Generation Communication System, Part 2: New Radio (NR) Radio Performance Simulations and Evaluations in Rail Environment", ETSI Draft Specification, 103 554-2 European Telecommunications Standards Institute (ETSI), 650, Route Des Lucioles, F-06921 Sophia-Antipolis, France, vol. TC RT Railway Telecommunications, No. V0.4.19, Jul. 23, 2020 (Jul. 23, 2020), XP014376414, pp. 1-127, Retrieved from the Internet: URL: docbox.etsi.org/RT/RT/70-Draft/0050/RT-0050v0419.docx [retrieved on Jul. 23, 2020] The Whole Document.

RAN1 Vice-Chair (Ericsson): "Moderator's Summary for Discussion [RAN93e-R18Prep-15] Additional RAN1/2/3 Candidate Topics, Set2", 3GPP Draft, 3GPP TSG RAN#93e RP-211665, 3rd Generation Partnership Project (3GPP), Mobile Competence Centre, 650, Route Des Lucioles, F-06921 Sophia-Antipolis Cedex, France, vol. RAN WG3, No. Electronic Meeting, Sep. 13, 2021-Sep. 17, 2021 Sep. 3, 2021 (Sep. 3, 2021), XP052047754, pp. 1-80, Retrieved from the Internet: URL: https://ftp.3gpp.org/tsg_ran/TSG_RAN/TSGR_93e/Inbox/RP-211665.zipRP-211665RAN93e-R18Prep-15-v0.0.5-Additional RAN123 Candidate Topics, Set 2.pdf [retrieved on Sep. 3, 2021] The Whole Document.

* cited by examiner

CONFIGURATIONS FOR NARROWBAND WIRELESS COMMUNICATION

CROSS-REFERENCE TO RELATED APPLICATIONS

The present application for patent claims priority to and the benefit of pending U.S. Provisional Application No. 63/143,419, titled "CONFIGURATIONS FOR NARROWBAND WIRELESS COMMUNICATION" filed Jan. 29, 2021, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to using one or more defined configurations for narrowband wireless communication.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A base station may provide service on one or more radio frequency (RF) bands. For example, one cell served by the base station may be on one RF band, while another cell served by the base station may be on another RF band.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment may include a transceiver, a memory, and a processor coupled to the transceiver and the memory. The processor and the memory may be configured to receive an indication that a base station supports a first radio frequency (RF) band, and communicate with the base station via the first RF band according to a first configuration based on a first minimum bandwidth size defined for the first RF band. In some examples, the first minimum bandwidth size is smaller than a second minimum bandwidth size defined for a second RF band available to the user equipment.

In some examples, a method for wireless communication at a user equipment may include receiving an indication that a base station supports a first radio frequency (RF) band, and communicating with the base station via the first RF band according to a first configuration based on a first minimum bandwidth size defined for the first RF band. In some examples, the first minimum bandwidth size is smaller than a second minimum bandwidth size defined for a second RF band available to the user equipment.

In some examples, a user equipment may include means for receiving an indication that a base station supports a first radio frequency (RF) band, and means for communicating with the base station via the first RF band according to a first configuration based on a first minimum bandwidth size defined for the first RF band. In some examples, the first minimum bandwidth size is smaller than a second minimum bandwidth size defined for a second RF band available to the user equipment.

In some examples, an article of manufacture for use by a user equipment includes a non-transitory computer-readable medium having stored therein instructions executable by one or more processors of the user equipment to receive an indication that a base station supports a first radio frequency (RF) band, and communicate with the base station via the first RF band according to a first configuration based on a first minimum bandwidth size defined for the first RF band. In some examples, the first minimum bandwidth size is smaller than a second minimum bandwidth size defined for a second RF band available to the user equipment.

In some examples, a base station may include a transceiver, a memory, and a processor coupled to the transceiver and the memory. The processor and the memory may be configured to transmit an indication that the base station supports a first radio frequency (RF) band, and communicate with a user equipment via the first RF band according to a first configuration based on a first minimum bandwidth size defined for the first RF band. In some examples, the first minimum bandwidth size is smaller than a second minimum bandwidth size defined for a second RF band available to the user equipment.

In some examples, a method for wireless communication at a base station may include transmitting an indication that the base station supports a first radio frequency (RF) band, and communicating with a user equipment via the first RF band according to a first configuration based on a first minimum bandwidth size defined for the first RF band. In some examples, the first minimum bandwidth size is smaller than a second minimum bandwidth size defined for a second RF band available to the user equipment.

In some examples, a base station may include means for transmitting an indication that the base station supports a first radio frequency (RF) band, and means for communicating with a user equipment via the first RF band according to a first configuration based on a first minimum bandwidth size defined for the first RF band. In some examples, the first minimum bandwidth size is smaller than a second minimum bandwidth size defined for a second RF band available to the user equipment.

In some examples, an article of manufacture for use by a base station includes a non-transitory computer-readable medium having stored therein instructions executable by one or more processors of the base station to transmit an indication that the base station supports a first radio frequency (RF) band, and communicate with a user equipment via the first RF band according to a first configuration based on a first minimum bandwidth size defined for the first RF band. In some examples, the first minimum bandwidth size is smaller than a second minimum bandwidth size defined for a second RF band available to the user equipment.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
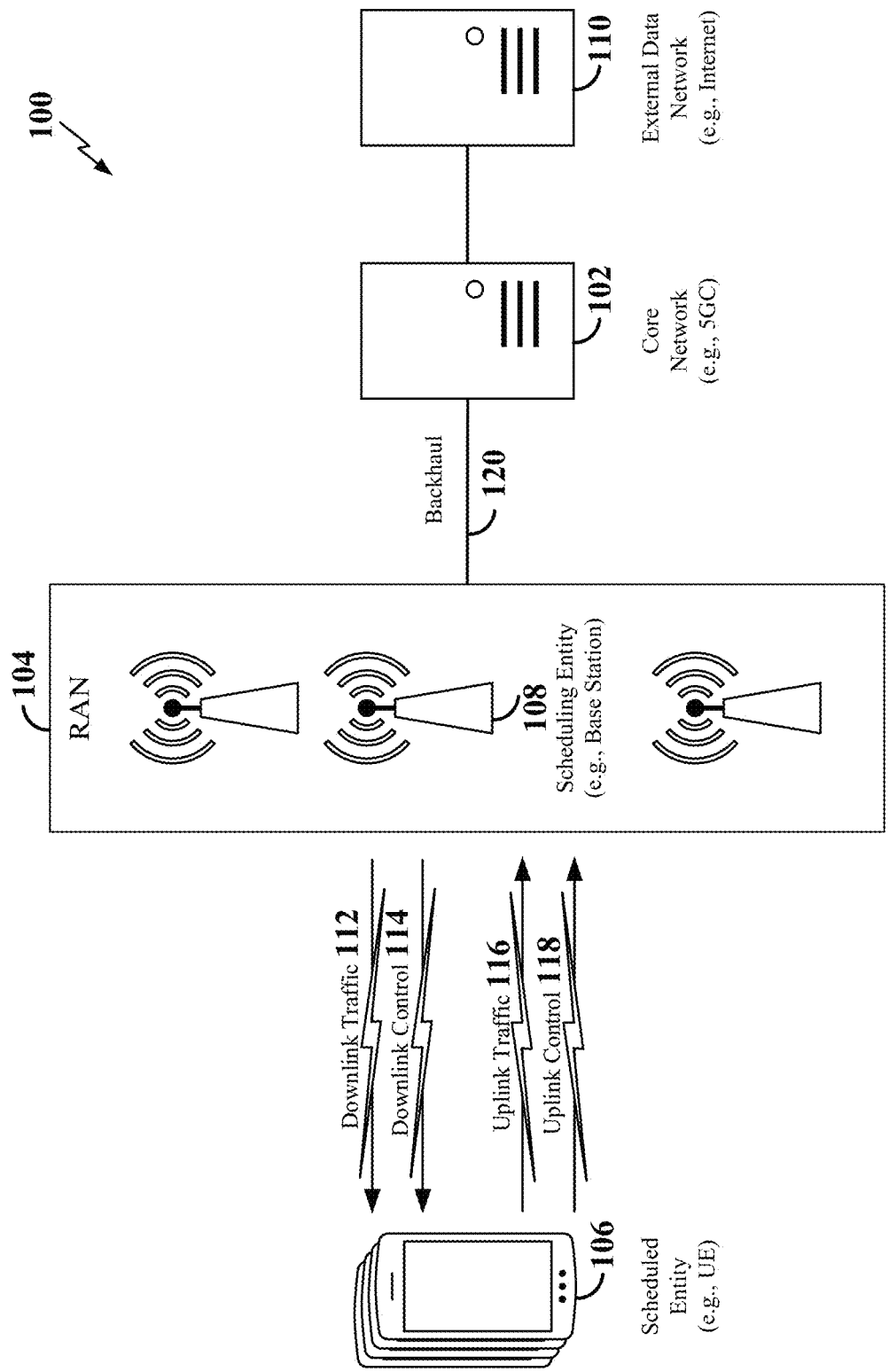
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

The disclosure relates in some aspects to one or more configurations for wireless communication via a radio frequency (RF) band. Conventional wireless communication systems may use relatively wide RF bands (e.g., 5 megahertz (MHz) or greater). In addition, these wireless communication systems may use a nominal bandwidth part (BWP) size of 5 MHz.

The disclosure relates in some aspects to wireless communication on a narrower RF band (e.g., less than 4 MHz). In this case, a base station and a user equipment may use a different configuration for communication on the narrower RF band than is used on a wider RF band. For example, communication of uplink signals and/or downlink signals may be based on a smaller minimum BWP size (e.g., 3.6 MHz).

The disclosure relates in some aspects to a base station and a user equipment disabling one or more features when communicating on a narrower RF band. For example, the base station and the user equipment may disable for narrowband communication one or more of particular reference signals, modulation and coding schemes, frequency hopping, random access frequency division multiplexing, random access formats, or a combination thereof.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
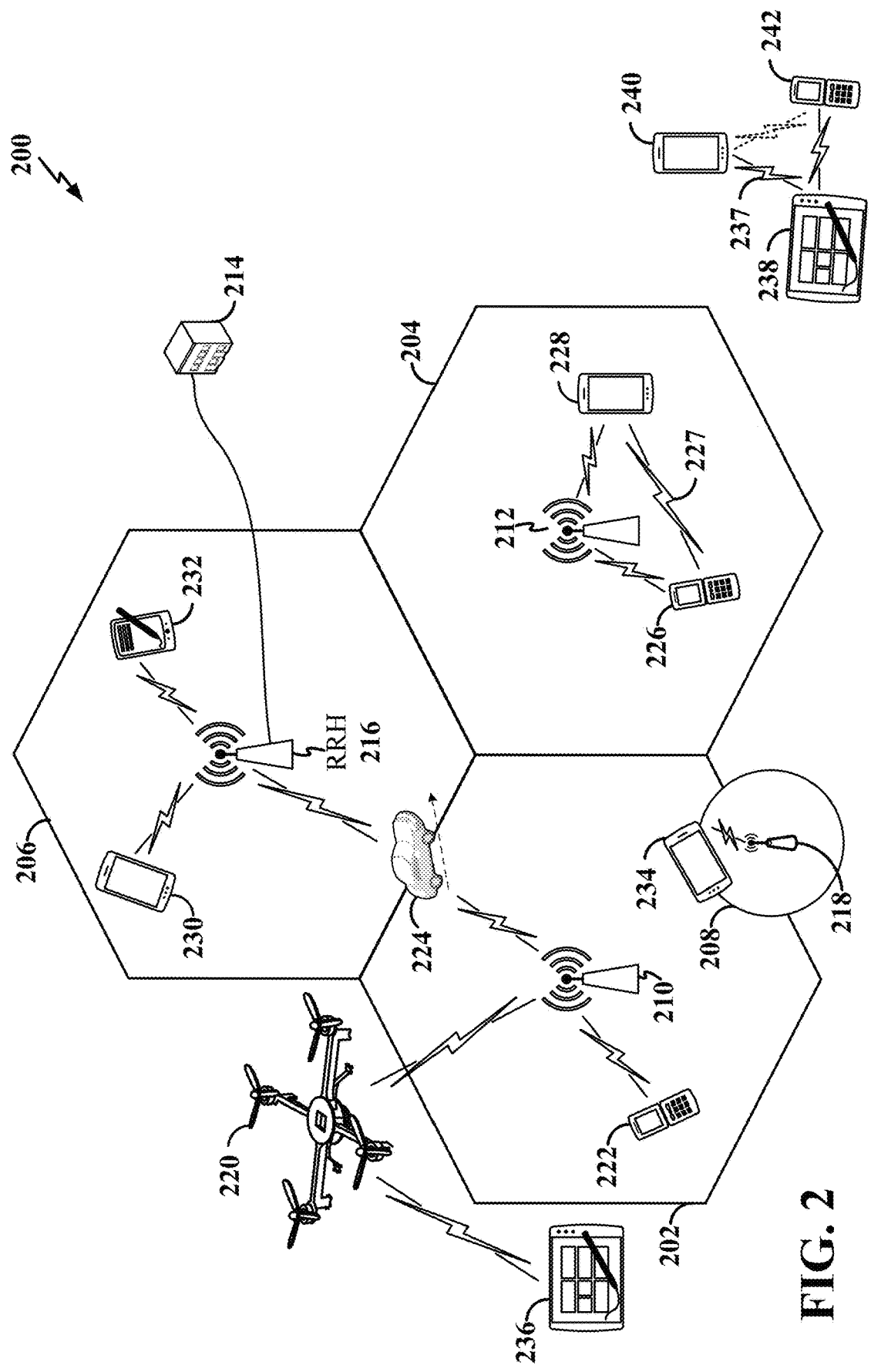
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, a particular frequency value (e.g., a 5 MHz bandwidth, a 3.6 MHz bandwidth, etc.) or range of values (e.g., 410 MHz-7.125 GHz) may be specified (e.g., specified by a wireless communication standard or regulatory body). In some examples, the actual operating frequency of a wireless communication device (e.g., a UE or a base station) may vary slightly from the specified nominal value or values. For example, a wireless communication device configured to use a 5 MHz bandwidth may transmit signals over a bandwidth that is slightly more or slightly less than 5 MHz. As used herein, a reference to a specific frequency value or range of values should be understood to include small variations in the nominal frequency or range of frequencies (e.g., +/−5%).

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
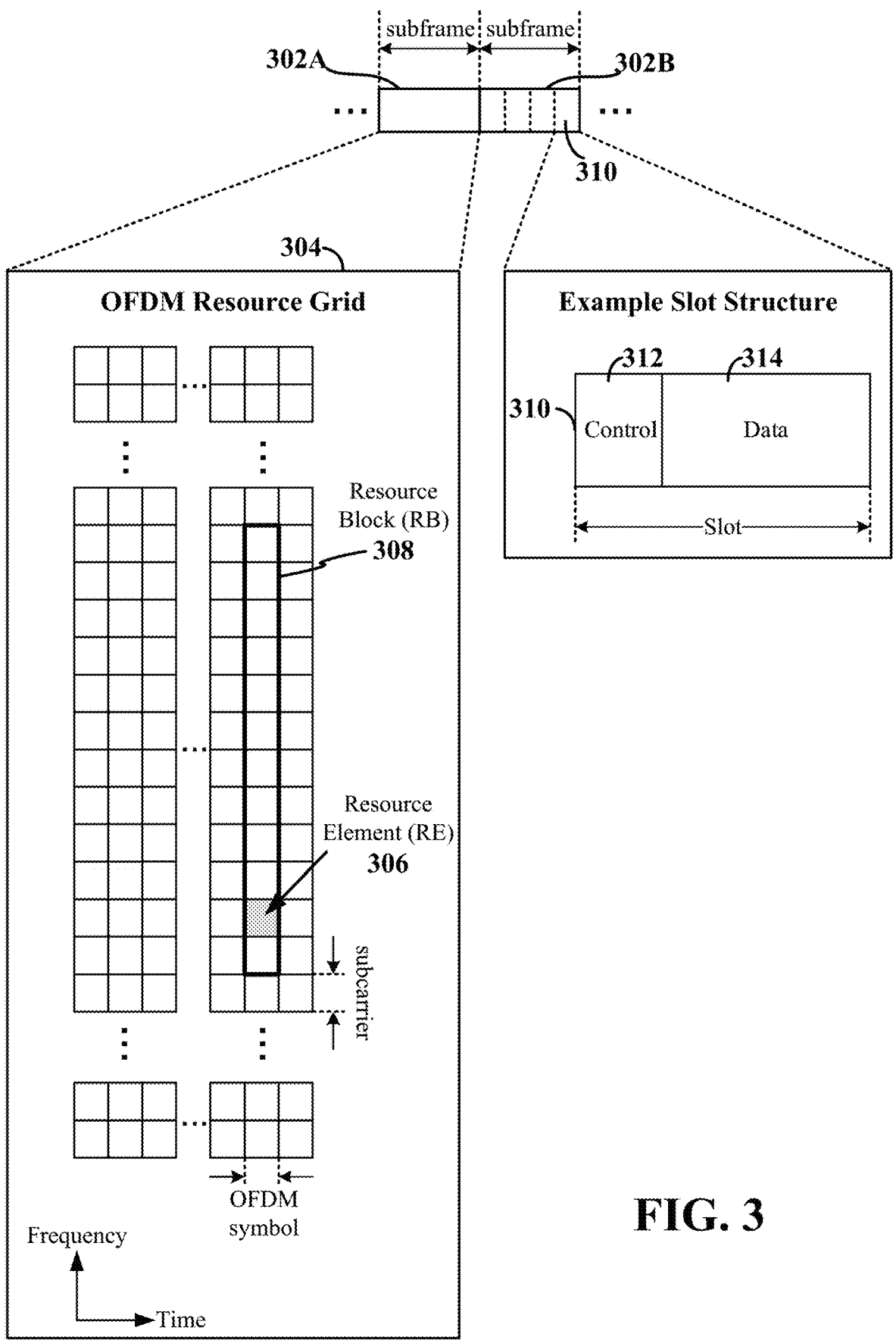
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal.

Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In some examples, antenna ports used to transmit SSBs or other signals may be referred to as being quasi co-located (QCL'ed) if the spatial parameters of a transmission on one antenna port may be inferred from the spatial parameters of another transmission on a different antenna port. A receiving device (e.g., a UE) may be able to perform channel estimation for demodulating data or control information received from a first set of antenna ports based on reference signals received from a second set of antenna ports that are quasi co-located with the first set of antenna ports. Thus, a quasi co-location (QCL) relationship between antenna ports may improve the chances that a UE may successfully decode a downlink transmission from a base station. In some cases, a base station may transmit to a UE an indication of which antenna ports are QCL'ed such that the UE may be able to identify additional reference signals to use for channel estimation.

In some examples, a base station may configure a set of transmission configuration indication (TCI) states to indicate to a UE one or more QCL relationships between antenna ports used for transmitting downlink signals to the UE. Each TCI state may be associated with a set of reference signals (e.g., SSBs or different types of CSI-RSs), and the TCI state may indicate a QCL relationship between antenna ports used to transmit the set of reference signals and antenna ports used to transmit data or control information to a UE. As such, when a UE receives an indication of a particular TCI state from a base station (e.g., in DCI), the UE may determine that antenna ports used to transmit the reference signals associated with the TCI state are quasi co-located with antenna ports used to transmit data and control information to the UE. The UE may use the reference signals associated with the TCI state to perform channel estimation for demodulating data or control information received from the base station.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
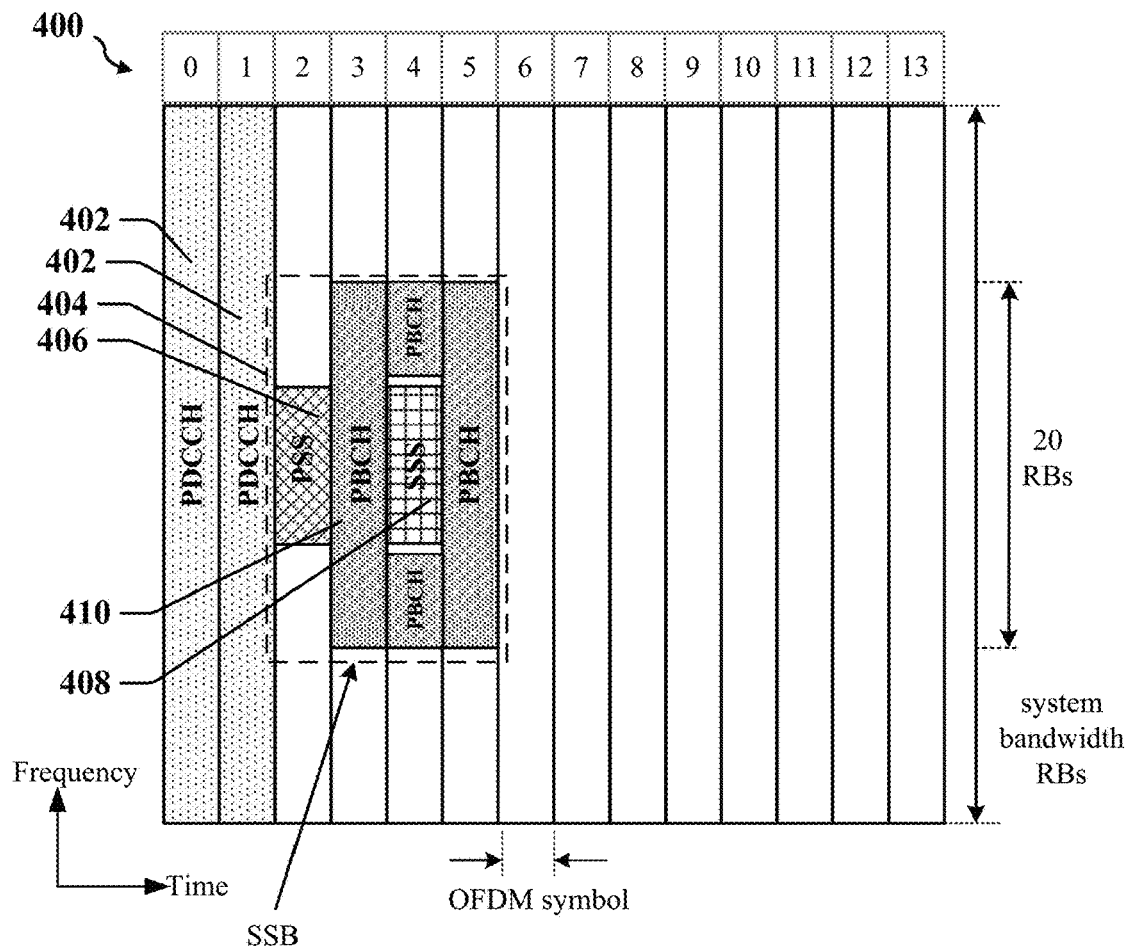
FIG. 4A is a diagram illustrating an example of a frame structure of synchronization signals for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within at least one control channel element (CCE), with each CCE including nine RE groups (REGs), and each RE group (REG) including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., the SSB 404. The MIB provides a number of RBs in the system bandwidth and a system frame number (SFN).

Figure 4B:
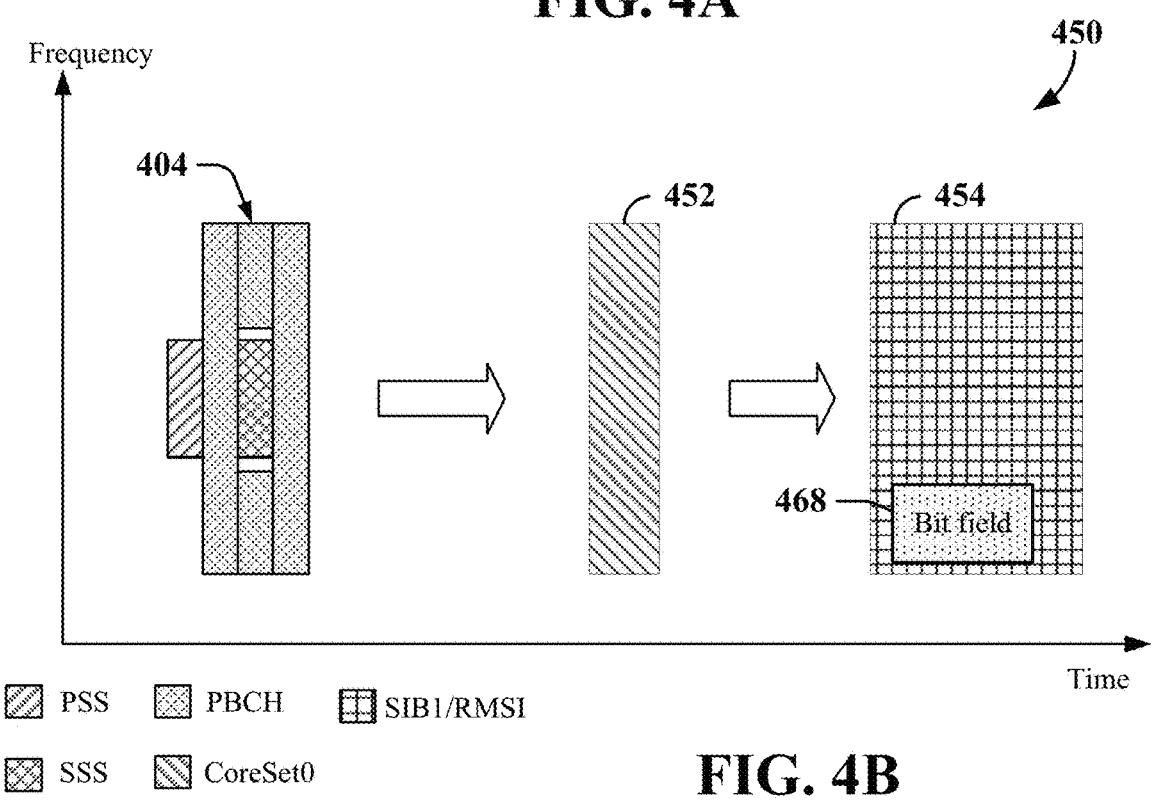
FIG. 4B is a diagram illustrating an example of a portion of a frame or subframe structure with various channels and associated messages for use in a wireless communication network according to some aspects.

FIG. 4B is a diagram illustrating various broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes the SSB 404 illustrated in FIG. 4A. It is noted that the PBCH in the SSB 404 includes the MIB carrying various system information (SI) including, for example, a cell barred indication, the subcarrier spacing, the system frame number, and scheduling information for a CORESET0 452. For example, the PBCH in the SSB 404 may include scheduling information indicating time-frequency resources allocated for the CORESET0 452. In some examples, the CORESET0 452 may be transmitted within the first four symbols (e.g., within a control region) of a slot. In addition, the CORESET0 452 carries a PDCCH with DCI that contains scheduling information for scheduling the SIB1 454. The SIB1 454 is carried within a physical downlink shared channel (PDSCH) within a data region of a slot. In addition, the SIB1 454 may be referred to as RMSI and includes, for example, a set of radio resource parameters providing network identification and configuration. For example, the set of radio resource parameters may include a bandwidth (e.g., number of BWPs) on which a UE may communicate with a base station.

FIG. 4B also illustrates that the RMSI of the SIB1 message 454 may also include a bit field 468 (e.g., indicating availability of narrowband wireless communication and/or configurations therefor). The time/frequency location of this bit field 468 is merely exemplary to show that this bit field 468 utilizes some of the time and frequency resources of the SIB1 message 454.

The MIB in the PBCH may include system information (SI), along with parameters for decoding a SIB (e.g., SIB1). Examples of SI transmitted in the MIB may include, but are not limited to, a subcarrier spacing, a system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a base station (BS) may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN (e.g., the RAN 200 of FIG. 2) may perform an initial cell search by detecting a PSS from a BS (e.g., the PSS of a cell of the BS) of the RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information may include information that a UE can use to access the network such as downlink (DL) channel configuration information, uplink (UL) channel configuration information, access class information, and cell barring information, as well as other information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN. In some examples, the SIB2 includes random access configuration information (e.g., a RACH configuration) that indicates the resources that the UE is to use to communicate with the RAN during initial access. The random access configuration information may indicate, for example, the resources allocated by the RAN for a random access channel (RACH) procedure. For example, the RACH configuration may indicate the resources allocated by the network for the UE to transmit a physical random access channel (PRACH) preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
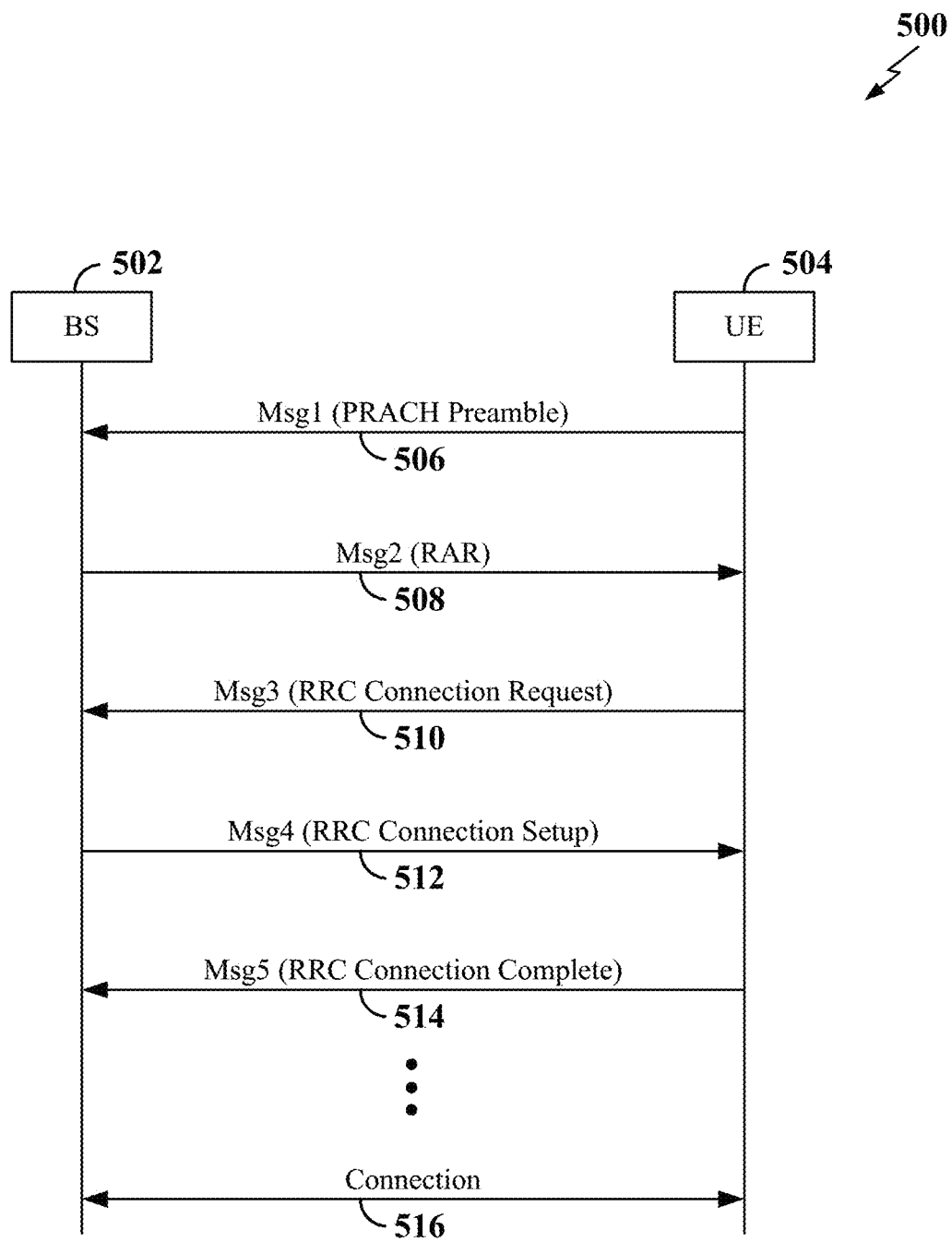
FIG. 5 is a signaling diagram of an example of random access channel (RACH) signaling according to some aspects.

FIG. 5 is a signaling diagram 500 illustrating an example of signaling for a contention-based RACH procedure in a wireless communication system including a base station (BS) 502 and a user equipment (UE) 504. In some examples, the base station 502 may correspond to any of the base stations or scheduling entities shown in any of FIGS. 1, 2, and 20. In some examples, the UE 504 may correspond to any of the UEs or scheduled entities shown in any of FIGS. 1, 2, and 16.

At #506 of FIG. 5, the UE 504 transmits a message 1 (Msg1) of the RACH procedure to the BS 502. In some examples, the Msg1 is a PRACH preamble. RACH Msg1 may be referred to as PRACH. As mentioned above, the UE 504 may transmit the PRACH preamble on resources specified by a RACH configuration included in SIB2.

At #508, the BS 502 responds to the PRACH preamble with a message 2 (Msg2) of the RACH procedure. The Msg2 may be referred to informally as a random access response (RAR). In some examples of #508, the BS 502 transmits a DCI on a PDCCH, where the DCI schedules a PDSCH (e.g., the DCI specifies the resources for the PDSCH transmission). The BS 502 then transmits the PDSCH which includes the RAR data such as, for example, an UL grant for the UE to transmit a message 3 (Msg3) of the RACH procedure.

In some examples, the UE monitors for the RACH Msg2 on resources specified by the RACH configuration during the RAR window specified by the RACH configuration. For example, the UE may decode the DCI carried on the PDCCH and then decode the RAR carried on the PDSCH.

At #510, upon receiving all of the RAR information, the UE 504 transmits the Msg3 of the RACH procedure. In some examples, the RACH Msg3 is a radio resource control (RRC) Connection Request message.

At #512, the BS 502 responds with a message 4 (Msg4) of the RACH procedure. In some examples, the RACH Msg4 is an RRC Connection Setup message.

At #514, the UE 504 responds with a message 5 (Msg5) of the RACH procedure. In some examples, the RACH Msg5 is an RRC Connection Complete message. In some examples, if the UE 504 successfully decodes the RACH Msg 4, the transmission of RACH Msg5 may involve transmitting a PUCCH including a HARQ-ACK for the PDSCH data of RACH Msg4. In some examples, PUCCH frequency hopping may be used for this transmission of the RACH Msg5.

In some examples, before the dedicated PUCCH resource configuration, the PUCCH resource set can be configured by pucch-ResourceCommon, where the PUCCH resource set includes sixteen resources, each corresponding to a PUCCH format, a first symbol, a duration, a PRB offset $RB_{BWP}^{offset}$, and a cyclic shift index set for a PUCCH transmission. The PRB offset $RB_{BWP}^{offset}$ and the UL BWP size can be used to determine the frequency hopping pattern. For example, the UE may determine the PRB index of the PUCCH transmission in the first hop as $RB_{BWP}^{offset}+\lfloor r_{PUCCH}/N_{CS}\rfloor$ and the PRB index of the PUCCH transmission in the second hop as $N_{BWP}^{size}-1-RB_{BWP}^{offset}-\lfloor r_{PUCCH}/N_{CS}\rfloor$, where $N_{CS}$ is the total number of initial cyclic shift indexes in the set of initial cyclic shift indexes. In some examples, the nominal UL BWP size is 5 MHz with $N_{BWP}^{size}=24$.

As indicated by #516, the BS 502 and the UE 504 ultimately establish a connection and enter an active operational phase where data may be exchanged. For example, the BS may schedule the UE for UL communication and/or DL communication as discussed herein.

Figure 6:
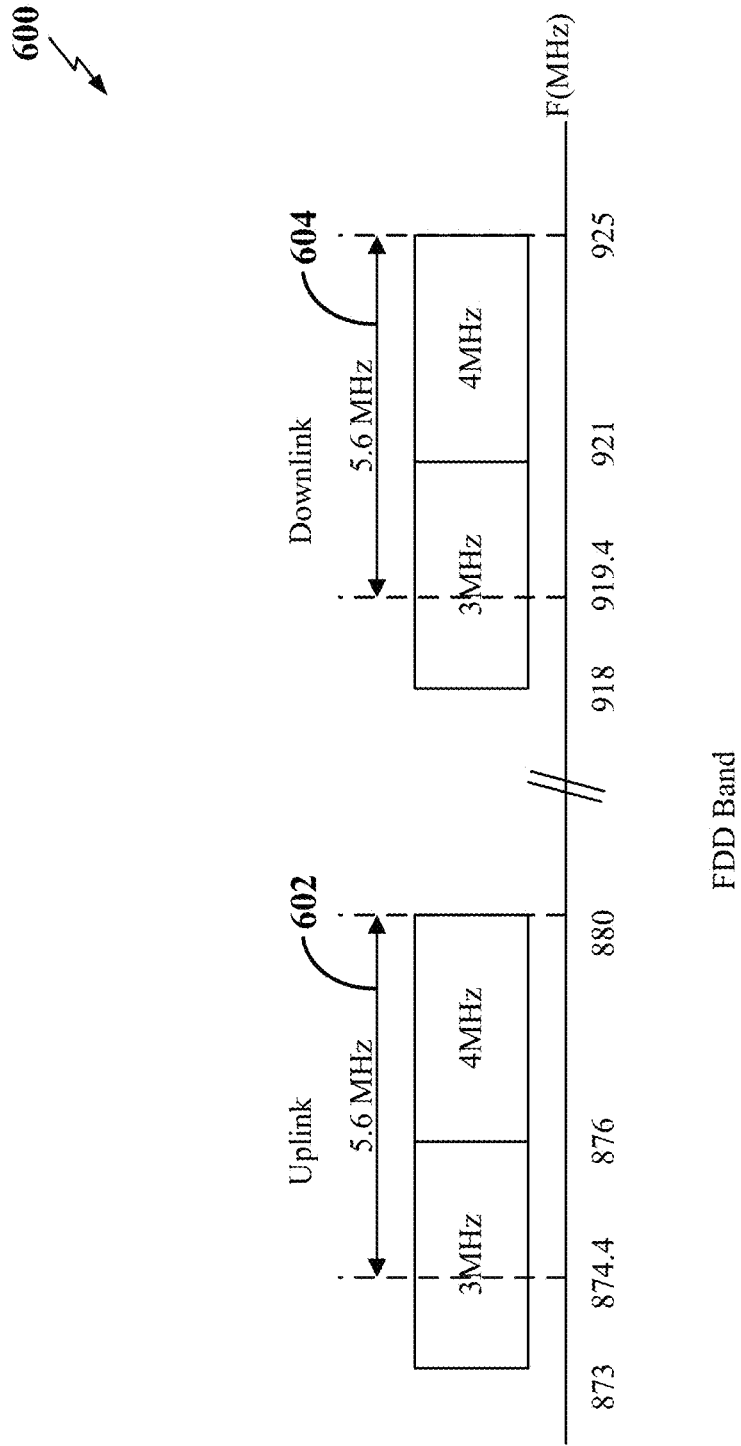
FIG. 6 is a conceptual illustration of an example of a narrow radio frequency band according to some aspects.

The Global System for Mobile Communications (GSM) for railway (GSM-R) supports more than 100,000 kilometers of railway tracks in Europe. However, the end of support for GSM-R is planned by approximately the year 2030. The Future Railway Mobile Communication System (FRMCS) is being developed for migration from 2G GSM-R to 5G NR with more forward compatibility to future 6G systems. In some aspects, this may involve reallocating GSM bands for FRMCS. For example, as shown in FIG. 6, a GSM 900 MHz FDD band 600 has been used for rural areas. This 900 MHz FDD band 600 includes two 5.6 MHz GSM-R bands 602 and 604. For FRMCS, two 3.6 MHz bands (not shown) based on 5G NR may be used within the two 5.6 MHz bands, while supporting coexistence with GSM-R.

Figure 7:
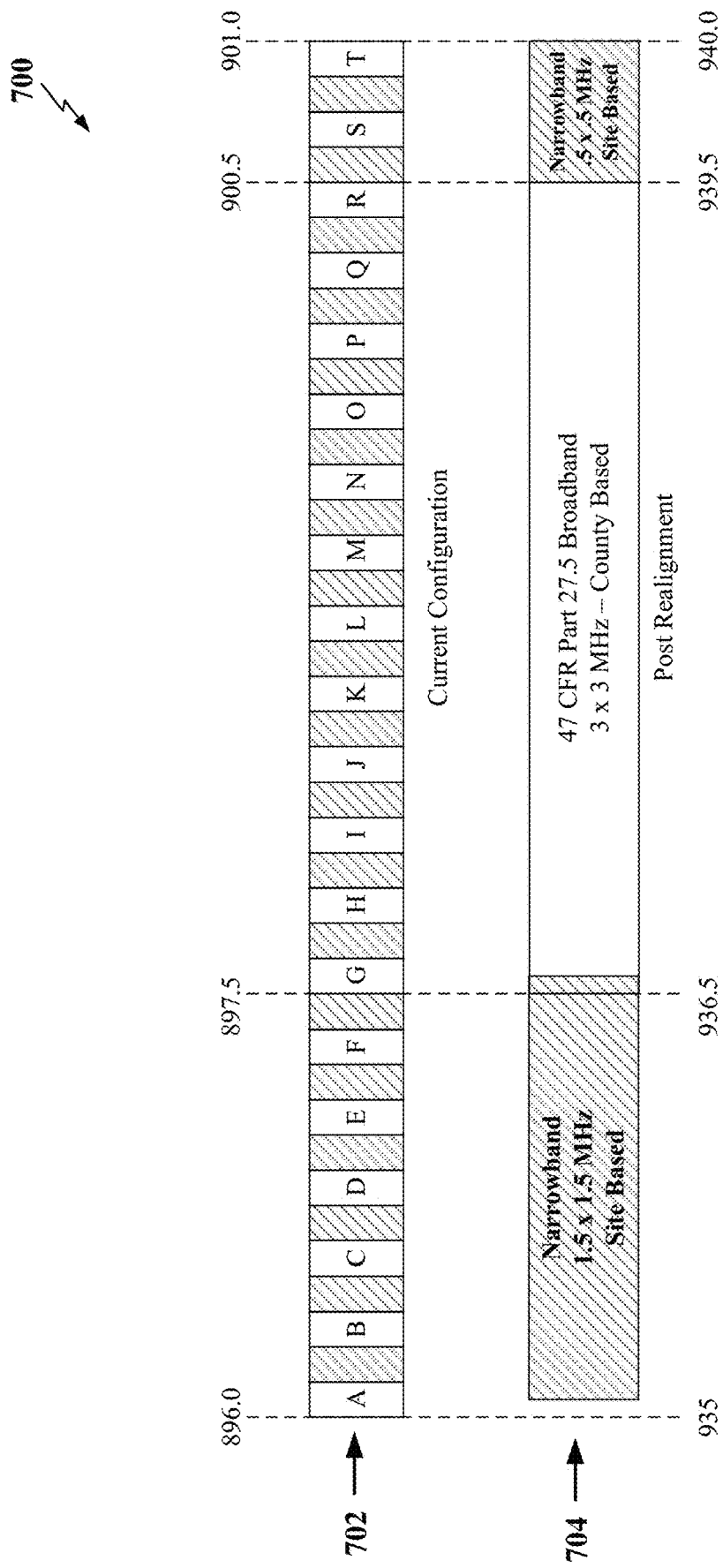
FIG. 7 is a conceptual illustration of another example of a narrow radio frequency band according to some aspects.

Similarly, in the United States, the 900 MHz band 700 shown in FIG. 7 is currently configured as illustrated at the top portion 702 of FIG. 7. This band may be repurposed into two 3 MHz FDD bands (not shown) for broadband services, e.g., a utility grid private network, based on 5G NR.

In some examples, a CSI-RS is configured with 4n RBs. In this case, a UE may expect that $N_{CSI-RS}^{BW}\geq\min(24, N_{BWP}^{size})$. If the bandwidth (BW)=5 MHz, the number of RBs for CSI-RS is 24 RBs in some examples.

In some examples, flexible tracking reference signal (TRS) BW can be configured as 5 MHz or 10 MHz if the BWP=10 MHz, based on UE capability. Here, the bandwidth of the CSI-RS resource, as given by the higher layer parameter freqBand configured by CSI-RS-ResourceMapping, is X resource blocks, where X≥28 resources (RBs) if the UE indicates trs-AddBW-Set1 for the trs-Additional-Bandwidth capability and X≥32 if the UE indicates trs-AddBW-Set2 for the AdditionalBandwidth capability. If the UE is configured with CSI-RS including X<52 resource blocks, the bandwidth of the CSI-RS resource, as given by the higher layer parameter freqBand configured by CSI-RS-ResourceMapping, is the minimum of 52 and $N_{BWP,i}^{size}$ resource blocks, or is equal to $N_{BWP,i}^{size}$ resource blocks.

Thus, in the above examples, even for UEs supporting flexible TRS BW, the minimum BW of CSI-RS/TRS is 5 MHz. This is larger than 3.6 MHz BW or the 3.0 MHz BW of the proposed narrow RF communication bands of FIGS. 6 and 7, respectively.

The disclosure relates in some aspects to CSI-RS and TRS configurations for UEs that support narrowband NR. These UEs may be referred to herein as narrowband NR UEs.

In a first example (1-Alt1), the nominal BWP is configured as 5 MHz (as in wideband systems), but support is also provided for flexible CSI-RS/TRS BW to be within a narrowband that is smaller than 5 MHz. For example, to support NR-railway (NR-R) CSI-RS of 16 RBs or 20 RBs, CSI-RS may be modified to be configured with $N_{CSI-RS}^{BW}\geq\min(16, N_{BWP}^{size})$. In addition, TRS may be modified with X=16 RBs or 20 RBs based on UE capability for flexible TRS.

In a second example (1-Alt1a), the nominal BWP is configured as 5 MHz (as in wideband systems), but TRS is disabled for narrowband NR. In this case, since the SSB and the TRS may have the same BW, the TRS may be omitted. In this case, a UE may assume that the QCL relation (e.g., relationship) for PDSCH DMRS is based on the SSB instead of the TRS. In addition, at an initial stage, the use of high MCS values (e.g., that require TRS) may be restricted.

In a third example (1-Alt2), a new UE capability is defined that supports a DL BWP with a size of 3.6 MHz (or some other BWP size). In this case, the CSI-RS/TRS BW will be mapped to the flexible DL BWP size.

Legacy PUCCH configurations can use frequency hopping within an UL BWP. If the UL BWP is configured as 5 MHz, the UL PUCCH frequency hopping will be out of the range of 3.6 MHz.

The disclosure relates in some aspects to PUCCH configurations for narrowband NR UEs.

In a first example (2-Alt1), the nominal BWP is configured as 5 MHz (as in wideband systems), but a different frequency hopping pattern is used for UEs with limited BW (e.g., 3.6 MHz).

In a second example (2-Alt1a), the nominal BWP is configured as 5 MHz (as in wideband systems), but PUCCH frequency hopping is not used for UEs with limited BW (e.g., 3.6 MHz).

In a third example (2-Alt2), a new UE capability is defined that supports an UL BWP with a size of 3.6 MHz (or some other BWP size).

The disclosure relates in some aspects to random access configurations for narrowband NR UEs. Legacy random access is on an initial UL BWP with a minimum bandwidth (minBW) of 5 MHz.

In a first example (3-Alt1), the nominal BWP is configured as 5 MHz (as in wideband systems), but a restriction is added on the random access (RA) configuration. For RACH Msg1 frequency location: msg1-FrequencyStart: 0 . . . 274, the RB offset of lowest location of a PRACH occasion within narrowband NR is redefined. For, msg1-FDM: 1, 2, 4, 8, FDM is disabled (e.g., use set 1 only).

Also, only some RACH Msg1 PRACH format configurations may be supported. For example, a long PRACH: format 0/1/2 with 1.08 MHz may be used; but format 3 with 4.32 MHz>3.6 MHz might not be supported. A short PRACH with 2.16 MHz can fit in 3.6 MHz, and may therefore be supported.

For RACH Msg4 feedback, PUCCH frequency hopping may be disabled for HARQ-ACK feedback in pucch-ConfigCommon.

In a second example (3-Alt2), a new UE capability is defined that supports an initial UL BWP with a size of 3.6 MHz (or some other BWP size).

In view of the above, in some examples, the nominal minimum BWP size is 5 MHz while the BW for the UE and the gNB is less than 5 MHz (e.g., 3 MHz or 3.6 MHz). In these examples, a smaller BWP (e.g., 3.6 MHz) might not be explicitly defined or configured.

Alternatively, in some examples, a smaller BWP (e.g., 3.6 MHz) may be explicitly defined or configured. Thus, both the BWP and the BW for the UE and the gNB may be less than 5 MHz in these examples.

In a narrowband spectrum scenario with 16 RBs or 20 RBs, $N_{BWP}^{size}$ may be based on the actual narrowband size, instead of the nominal UL BWP size of 5 MHz with $N_{BWP}^{size}=24$ (e.g., as above discussed at #514 of FIG. 5). If the index #15 PUCCH resource set is configured, the PRB offset is conventionally based on the UL BWP size as $\lfloor N_{BWP}^{size}/4 \rfloor$ as specified in Table 9.2.1-1 of TS 38.213 V15.12.0 (2020 December). In the case of narrowband spectrum with 16 RBs or 20 RBs, a PRB offset $RB_{BWP}^{offset}$ may be six (6) in the case of a PUCCH resource set with indicated index #15, which is different from a PRB offset of four (4) with indicated index #14. In some examples, either the PRB offset $RB_{BWP}^{offset}$ is fixed as six (6) in the case of a PUCCH resource set with indicated index #15, or the PRB offset $RB_{BWP}^{offset}$ is based on the nominal UL BWP size of 24 RBs instead of the actual narrowband size. Alternatively, the UE does not expect pucch-ResourceCommon to indicate index #15.

Figure 8:
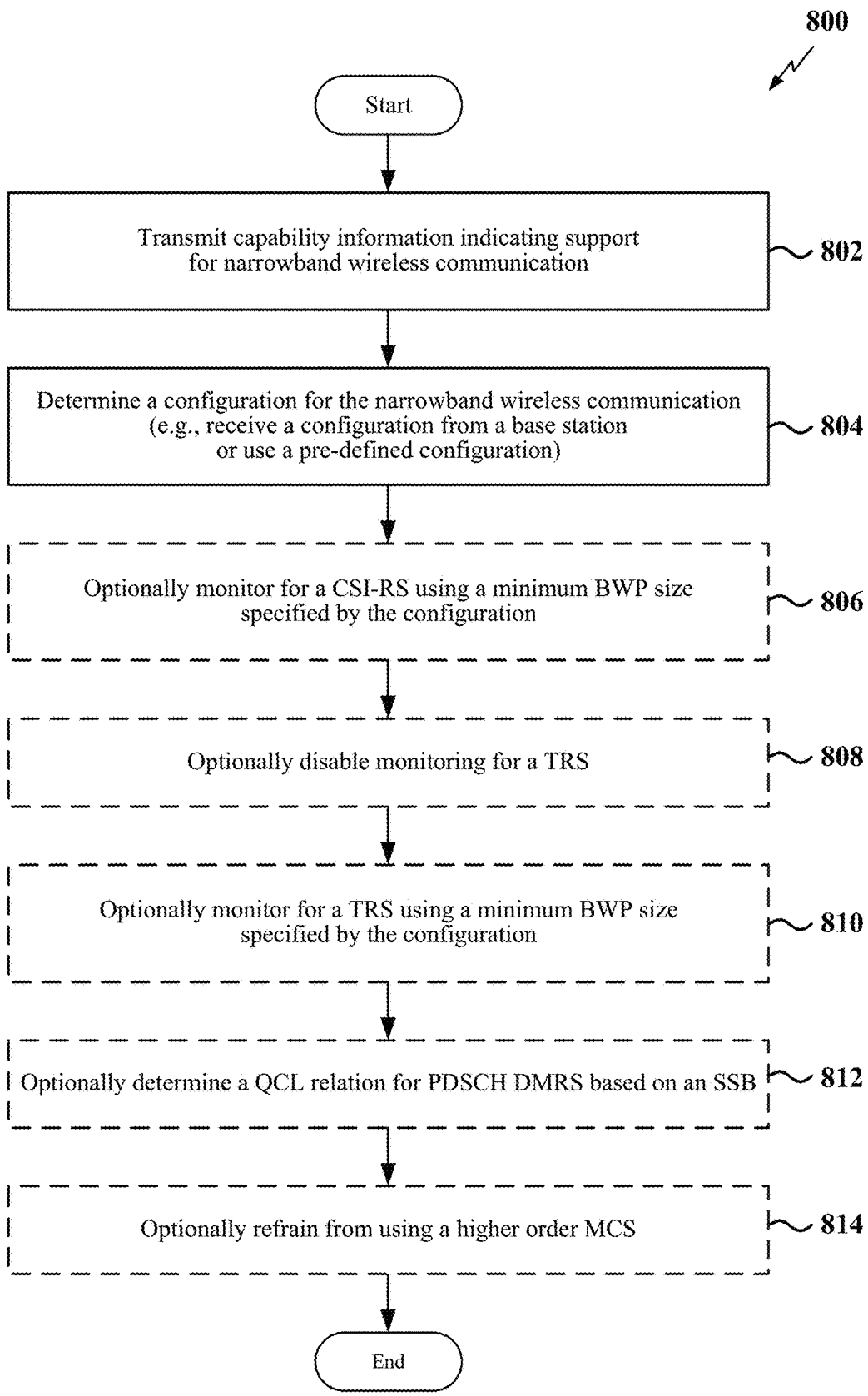
FIG. 8 is a flowchart illustrating an example of a method for narrowband downlink communication by a user equipment according to some aspects.

FIG. 8 is a flow chart illustrating an example method for wireless communication 800 according to some aspects of the disclosure. As described herein, some or all illustrated features may be omitted in a particular implementation within the scope of the present disclosure, and some illustrated features may not be required for implementation of all examples. In some examples, the method for wireless communication 800 may be carried out by the UE 1600 illustrated in FIG. 16. In some examples, the method for wireless communication 800 may be carried out by any suitable apparatus or means for carrying out the functions or algorithm described below.

At block 802, a UE transmits capability information indicating support for narrowband wireless communication. For example, the UE may transmit a UE capabilities message including an indication that the UE supports a 3 MHz band and/or a 3.6 MHz band. In some examples, the UE may transmit this capability information before or after receiving a message (e.g., via a SIB or some other signaling) that a base station supports narrowband communication (e.g., frequency bands of less than 5 MHz). The base station may also indicate whether it supports wideband communication (e.g., frequency bands of 5 MHz or greater). In some examples, the capability circuitry 1642 together with the communication and processing circuitry 1641 and the transceiver 1610, shown and described above in connection with FIG. 16, may provide a means to transmit capability information.

At block 804, the UE determines a configuration for the narrowband wireless communication. In some examples, the UE may receive a configuration from a base station. In some examples, the UE may use a pre-defined configuration (e.g., a narrowband configuration defined by a wireless communication standard). In some examples, the UE may identify the configuration specified for a particular RF band. In some examples, the configuration circuitry 1643, shown and described above in connection with FIG. 16, may provide a means to determine a configuration.

At optional block 806, the UE may monitor for a CSI-RS using a minimum BWP size specified by the configuration (determined at block 804) for narrowband wireless communication (e.g., a minimum BWP size of 5 MHz or less). In some examples, the configuration circuitry 1643 together with the communication and processing circuitry 1641 and the transceiver 1610, shown and described above in connection with FIG. 16, may provide a means to monitor for a CSI-RS.

At optional block 808, the UE may disable monitoring for a TRS if the configuration (determined at block 804) indicates that a TRS is not to be transmitted for the narrowband wireless communication. In some examples, the configuration circuitry 1643, shown and described above in connection with FIG. 16, may provide a means to disable monitoring for a TRS.

At optional block 810, the UE may monitor for a TRS using a minimum BWP size specified by the configuration (determined at block 804) for narrowband wireless communication (e.g., a minimum BWP size of 5 MHz or less). In some examples, the configuration circuitry 1643 together with the communication and processing circuitry 1641 and the transceiver 1610, shown and described above in connection with FIG. 16, may provide a means to monitor for a TRS.

At optional block 812, the UE may determine a QCL relation for PDSCH DMRS based on an SSB instead of a TRS if the configuration (determined at block 804) indicates that a TRS is not to be transmitted for the narrowband wireless communication. In some examples, the configuration circuitry 1643, shown and described above in connection with FIG. 16, may provide a means to determine a QCL relation.

Figure 9:
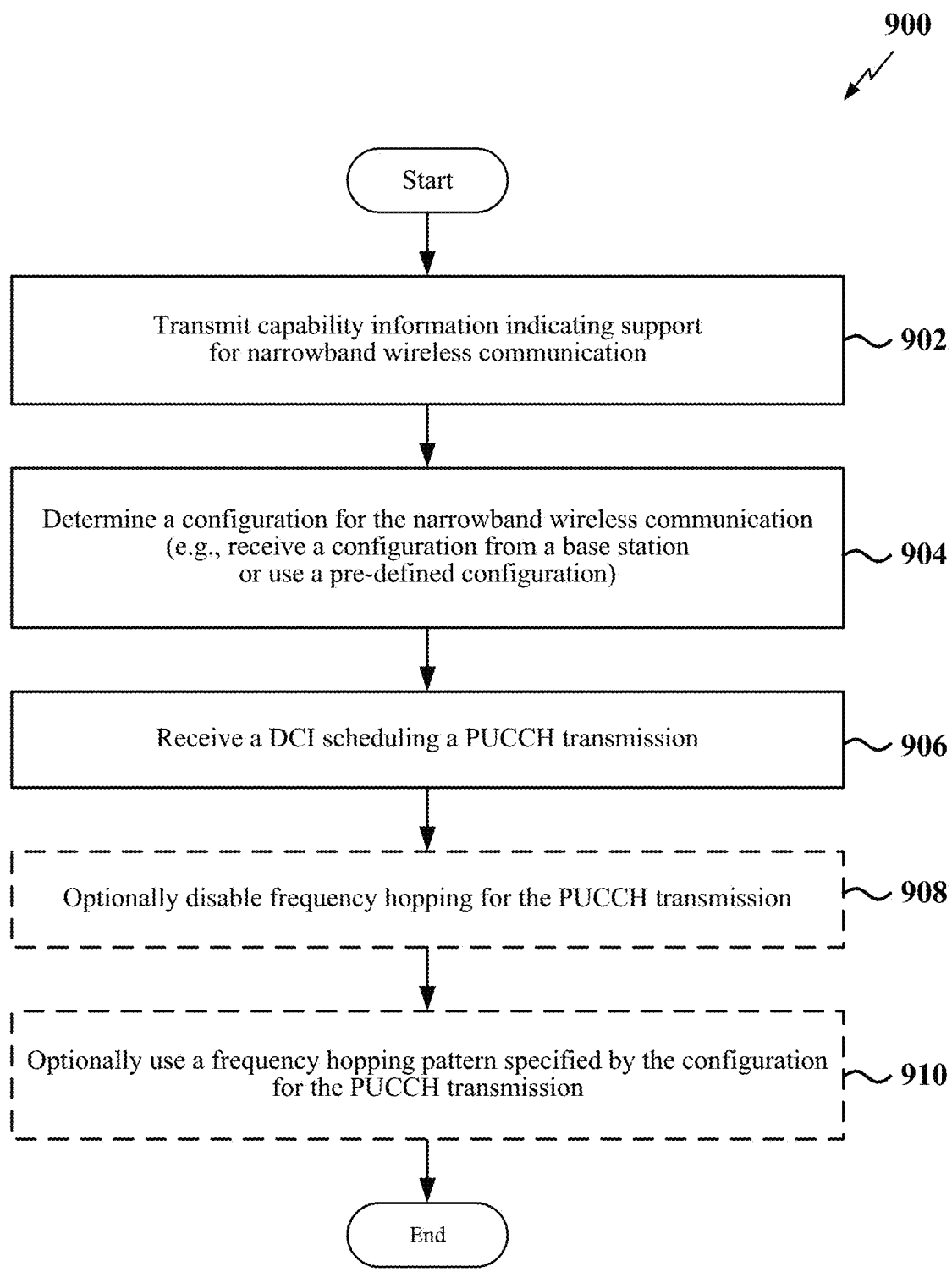
FIG. 9 is a flowchart illustrating an example of a method for narrowband uplink communication by a user equipment according to some aspects.

At optional block 814, the UE may refrain from using a higher order MCS if the configuration (determined at block 804) indicates that certain higher order MCSs are not to be used for the narrowband wireless communication (e.g., because a TRS is not transmitted). In some examples, the configuration circuitry 1643 together with the communication and processing circuitry 1641 and the transceiver 1610, shown and described above in connection with FIG. 16, may provide a means to refrain from using a higher order MCS FIG. 9 is a flow chart illustrating an example method for wireless communication 900 according to some aspects of the disclosure. As described herein, some or all illustrated features may be omitted in a particular implementation within the scope of the present disclosure, and some illustrated features may not be required for implementation of all examples. In some examples, the method for wireless communication 900 may be carried out by the UE 1600 illustrated in FIG. 16. In some examples, the method for wireless communication 900 may be carried out by any suitable apparatus or means for carrying out the functions or algorithm described below.

At block 902, a UE transmits capability information indicating support for narrowband wireless communication. For example, the UE may transmit a UE capabilities message including an indication that the UE supports a 3 MHz band and/or a 3.6 MHz band. In some examples, the capability circuitry 1642 together with the communication and processing circuitry 1641 and the transceiver 1610, shown and described above in connection with FIG. 16, may provide a means to transmit capability information.

At block 904, the UE determines a configuration for the narrowband wireless communication. In some examples, the UE may receive a configuration from a base station. In some examples, the UE may use a pre-defined configuration (e.g., a narrowband configuration defined by a wireless communication standard). In some examples, the configuration circuitry 1643, shown and described above in connection with FIG. 16, may provide a means to determine a configuration.

At block 906, the UE receives a DCI that includes scheduling information for a PUCCH transmission. For example, the UE may receive a DCI from a base station where the DCI indicates the resources to be used by the UE for the PUCCH transmission. In some examples, the configuration circuitry 1643 together with the communication and processing circuitry 1641 and the transceiver 1610, shown and described above in connection with FIG. 16, may provide a means to receive a DCI.

At optional block 908, the UE may disable frequency hopping for the PUCCH transmission if the configuration (determined at block 904) specifies that frequency hopping is not to be used for PUCCH transmissions for narrowband wireless communication. In some examples, the configuration circuitry 1643, shown and described above in connection with FIG. 16, may provide a means to disable frequency hopping.

At optional block 910, the UE may use a frequency hopping pattern specified by the configuration (determined at block 904) for the PUCCH transmission. For example, a base station may specify one frequency hopping pattern for narrowband wireless communication and another frequency hopping pattern for wideband wireless communication. In some examples, the configuration circuitry 1643 together with the communication and processing circuitry 1641 and the transceiver 1610, shown and described above in connection with FIG. 16, may provide a means to use a frequency hopping pattern.

Figure 10:
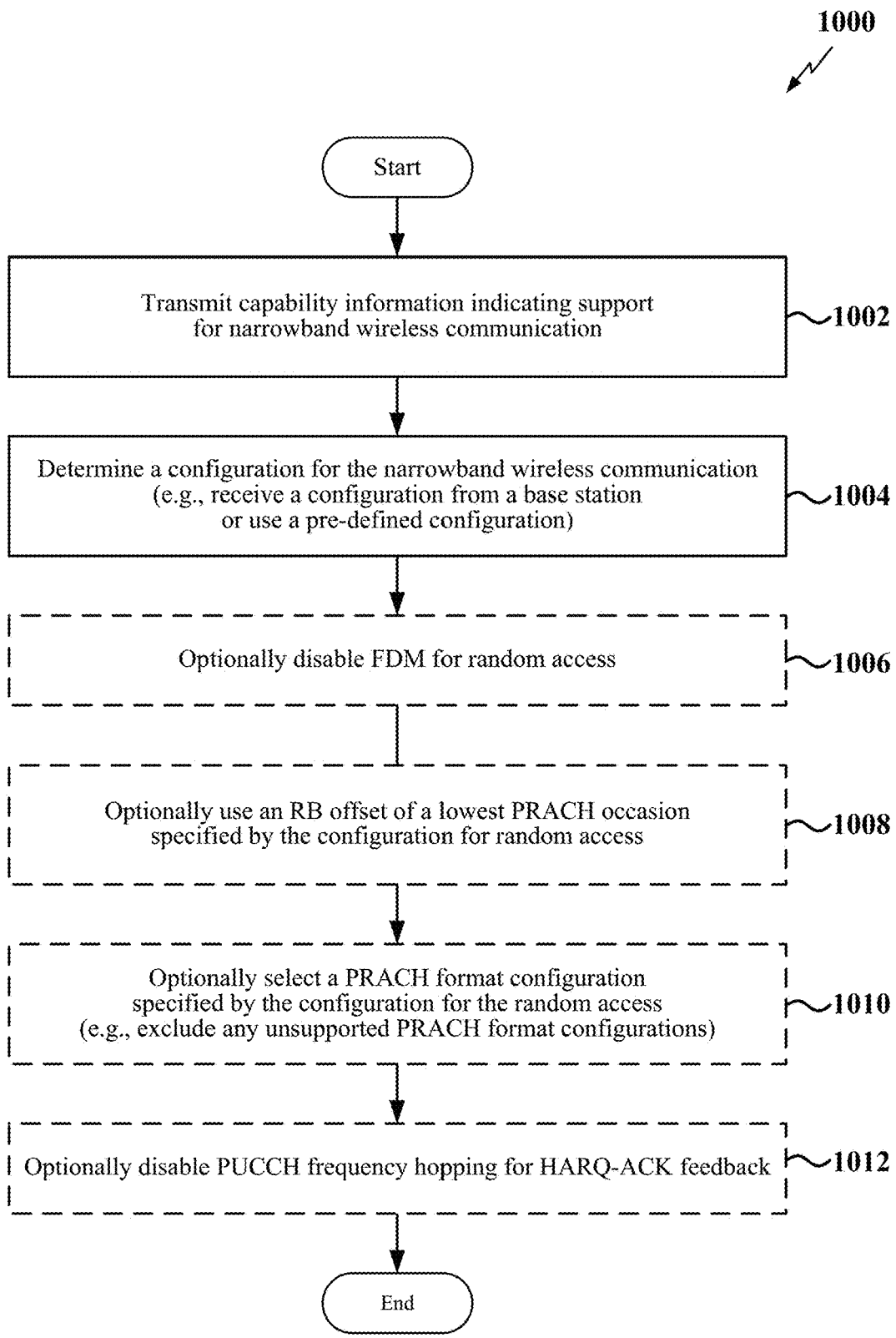
FIG. 10 is a flowchart illustrating an example of a method for narrowband random access communication by a user equipment according to some aspects.

FIG. 10 is a flow chart illustrating an example method for wireless communication 1000 according to some aspects of the disclosure. As described herein, some or all illustrated features may be omitted in a particular implementation within the scope of the present disclosure, and some illustrated features may not be required for implementation of all examples. In some examples, the method for wireless communication 1000 may be carried out by the UE 1600 illustrated in FIG. 16. In some examples, the method for wireless communication 1000 may be carried out by any suitable apparatus or means for carrying out the functions or algorithm described below.

At block 1002, a UE transmits capability information indicating support for narrowband wireless communication. For example, the UE may transmit a UE capabilities message to a base station, where the capabilities message includes an indication that the UE supports a 3 MHz band and/or a 3.6 MHz band. In some examples, the capability circuitry 1642 together with the communication and processing circuitry 1641 and the transceiver 1610, shown and described above in connection with FIG. 16, may provide a means to transmit capability information.

At block 1004, the UE determines a configuration for the narrowband wireless communication. In some examples, the UE may receive a configuration from a base station. In some examples, the UE may use a pre-defined configuration (e.g., a narrowband configuration defined by a wireless communication standard). In some examples, the configuration circuitry 1643, shown and described above in connection with FIG. 16, may provide a means to determine a configuration.

At block optional 1006, the UE may disable FDM for random access if the configuration (determined at block 1004) specifies that FDM is not to be used for random access for narrowband wireless communication. In some examples, the configuration circuitry 1643, shown and described above in connection with FIG. 16, may provide a means to disable FDM.

At optional block 1008, the UE may use an RB offset of a lowest PRACH occasion specified by the configuration (determined at block 1004) for random access. For example, a base station may specify one RB offset for narrowband wireless communication and another RB offset for wideband wireless communication. In some examples, the configuration circuitry 1643 together with the communication and processing circuitry 1641 and the transceiver 1610, shown and described above in connection with FIG. 16, may provide a means to use an RB offset of a lowest PRACH occasion.

At optional block 1010, the UE may select a PRACH format configuration specified by the configuration (determined at block 1004) for the random access. For example, the UE may avoid using any PRACH format configurations that are not supported for narrowband wireless communication as specified by the configuration. In some examples, the configuration circuitry 1643, shown and described above in connection with FIG. 16, may provide a means to select a PRACH format configuration.

At optional block 1012, the UE may disable PUCCH frequency hopping for HARQ-ACK feedback if this is specified by the configuration (determined at block 1004). In some examples, the configuration circuitry 1643, shown and described above in connection with FIG. 16, may provide a means to disable PUCCH frequency hopping.

Figure 11:
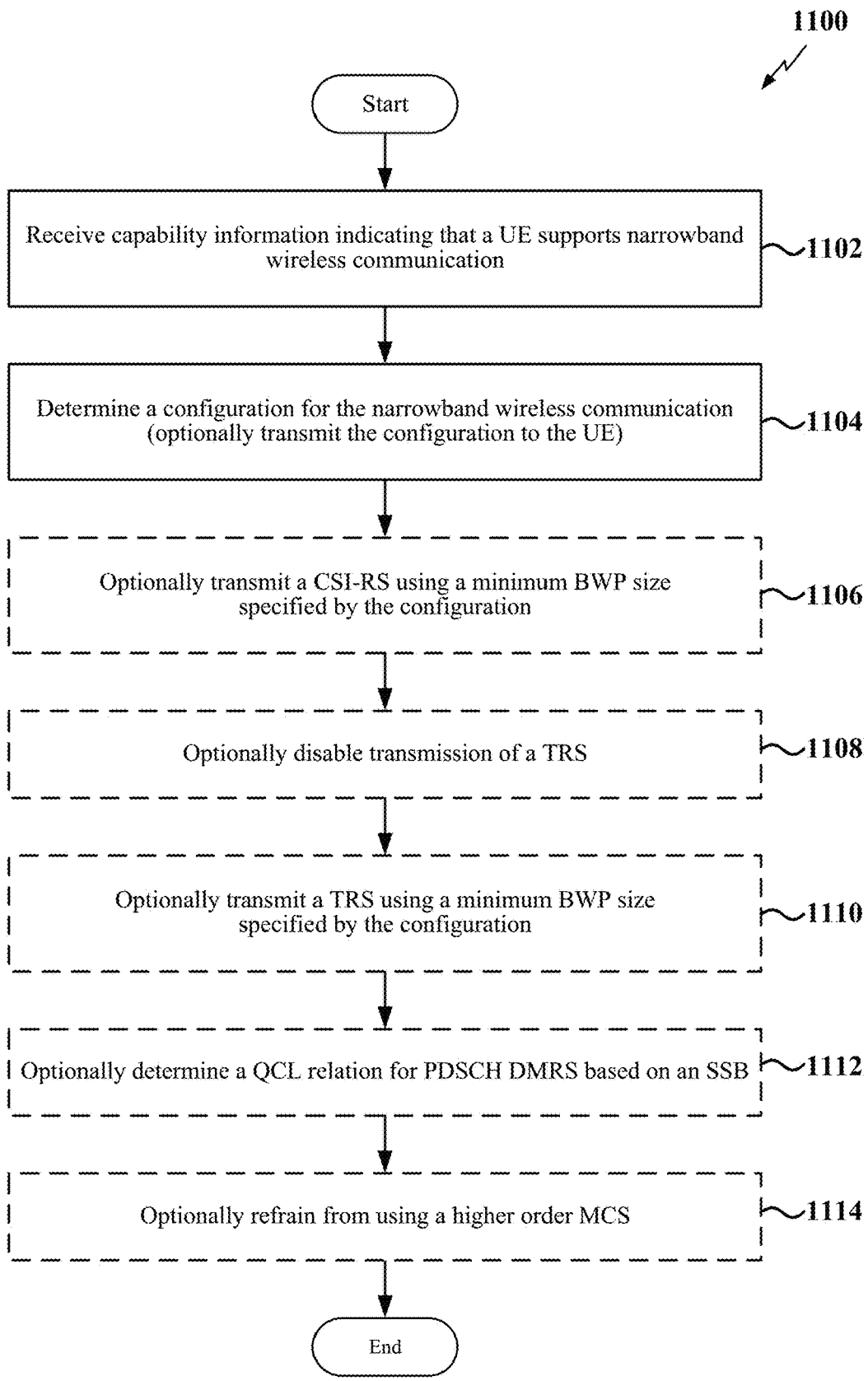
FIG. 11 is a flowchart illustrating an example of a method for narrowband downlink communication by a base station according to some aspects.

FIG. 11 is a flow chart illustrating an example method for wireless communication 1100 according to some aspects of the disclosure. As described herein, some or all illustrated features may be omitted in a particular implementation within the scope of the present disclosure, and some illustrated features may not be required for implementation of all examples. In some examples, the method for wireless communication 1100 may be carried out by the BS 2000 illustrated in FIG. 20. In some examples, the method for wireless communication 1100 may be carried out by any suitable apparatus or means for carrying out the functions or algorithm described below.

At block 1102, a base station receives capability information indicating that a UE supports narrowband wireless communication. For example, the base station may receive a UE capabilities message from a UE including an indication that the UE supports a 3 MHz band and/or a 3.6 MHz band. In some examples, the base station may receive this capability information before or after transmitting a message (e.g., via a SIB or some other signaling) that the base station supports narrowband communication (e.g., frequency bands of less than 5 MHz). The base station may also indicate whether it supports wideband communication (e.g., frequency bands of 5 MHz or greater). In some examples, the capability circuitry 2042 together with the communication and processing circuitry 2041 and the transceiver 2010, shown and described above in connection with FIG. 20, may provide a means to receive capability information.

At block 1104, the base station determines a configuration for the narrowband wireless communication (e.g., a narrowband configuration defined by a wireless communication standard). In some examples, the base station may identify the configuration specified for a particular RF band. In some examples, the base station may transmit the configuration to a UE. In some examples, the configuration circuitry 2043, shown and described above in connection with FIG. 20, may provide a means to determine a configuration.

At optional block 1106, the base station may transmit a CSI-RS using a minimum BWP size specified by the configuration (determined at block 1104) for narrowband wireless communication (e.g., a minimum BWP size of 5 MHz or less). In some examples, the configuration circuitry 2043 together with the communication and processing circuitry 2041 and the transceiver 2010, shown and described above in connection with FIG. 20, may provide a means to transmit a CSI-RS.

At optional block 1108, the base station may disable transmission of a TRS if the configuration (determined at block 1104) indicates that a TRS is not to be transmitted for the narrowband wireless communication. In some examples, the configuration circuitry 2043, shown and described above in connection with FIG. 20, may provide a means to disable transmission of a TRS.

At optional block 1110, the base station may transmit a TRS using a minimum BWP size specified by the configuration (determined at block 1104) for narrowband wireless communication (e.g., a minimum BWP size of 5 MHz or less). In some examples, the configuration circuitry 2043 together with the communication and processing circuitry 2041 and the transceiver 2010, shown and described above in connection with FIG. 20, may provide a means to transmit a TRS.

At optional block 1112, the base station may determine a QCL relation for PDSCH DMRS based on an SSB instead of a TRS if the configuration (determined at block 1104) indicates that a TRS is not to be transmitted for the narrowband wireless communication. In some examples, the configuration circuitry 2043, shown and described above in connection with FIG. 20, may provide a means to determine a QCL relation.

At optional block 1114, the base station may refrain from using a higher order MCS if the configuration (determined at block 1104) indicates that certain higher order MCSs are not to be used for the narrowband wireless communication (e.g., because a TRS is not transmitted). In some examples, the configuration circuitry 2043 together with the communication and processing circuitry 2041 and the transceiver 2010, shown and described above in connection with FIG. 20, may provide a means to refrain from using a higher order MCS.

Figure 12:
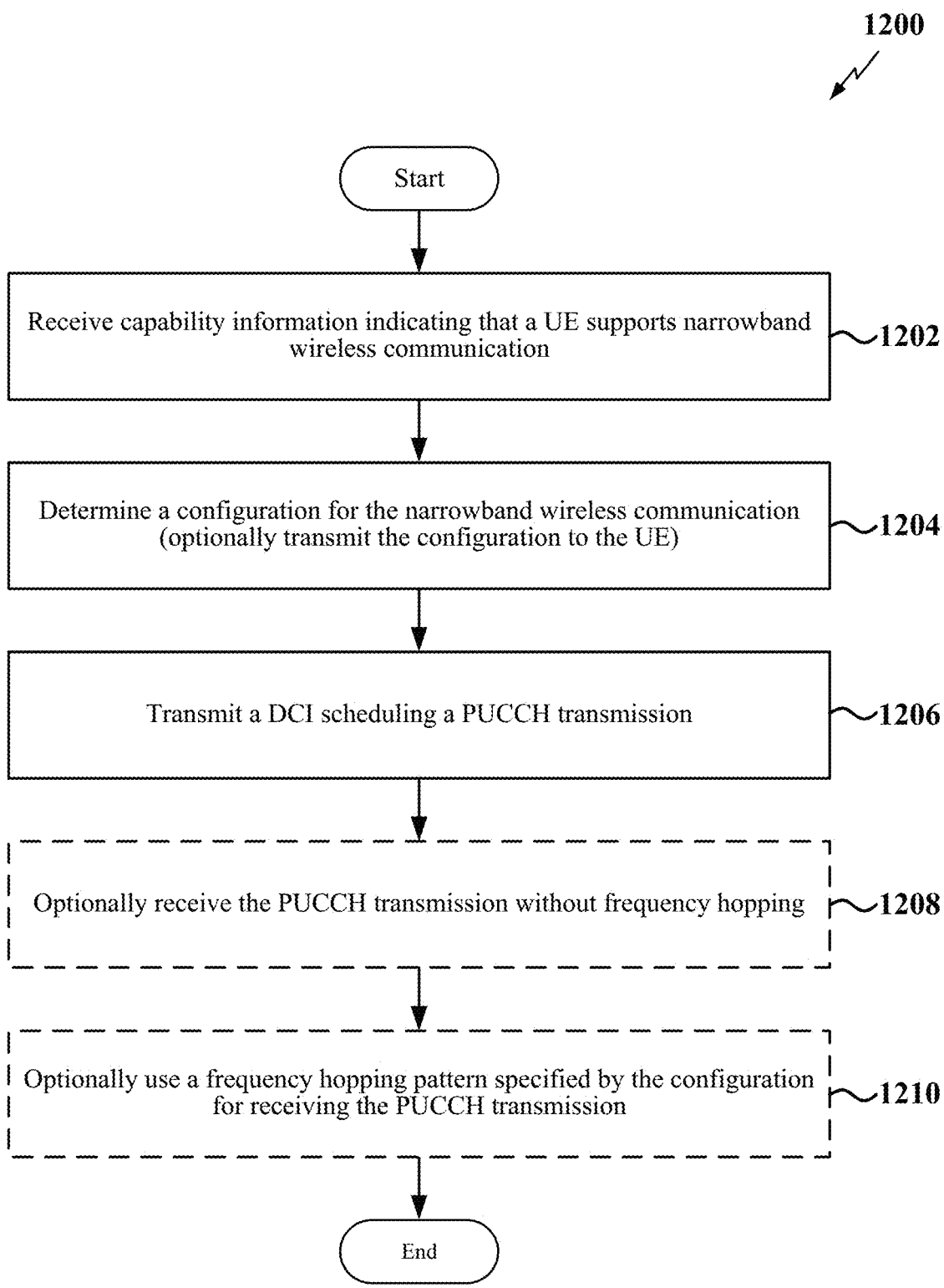
FIG. 12 is a flowchart illustrating an example of a method for narrowband uplink communication by a base station according to some aspects.

FIG. 12 is a flow chart illustrating an example method for wireless communication 1200 according to some aspects of the disclosure. As described herein, some or all illustrated features may be omitted in a particular implementation within the scope of the present disclosure, and some illustrated features may not be required for implementation of all examples. In some examples, the method for wireless communication 1200 may be carried out by the BS 2000 illustrated in FIG. 20. In some examples, the method for wireless communication 1200 may be carried out by any suitable apparatus or means for carrying out the functions or algorithm described below.

At block 1202, a base station receives capability information indicating that a UE supports narrowband wireless communication. For example, the base station may receive a UE capabilities message from a UE including an indication that the UE supports a 3 MHz band and/or a 3.6 MHz band. In some examples, the capability circuitry 2042 together with the communication and processing circuitry 2041 and the transceiver 2010, shown and described above in connection with FIG. 20, may provide a means to receive capability information.

At block 1204, the base station determines a configuration for the narrowband wireless communication (e.g., a narrowband configuration defined by a wireless communication standard). In some examples, the base station may transmit the configuration to a UE. In some examples, the configuration circuitry 2043, shown and described above in connection with FIG. 20, may provide a means to determine a configuration.

At block 1206, the base station transmits a DCI that includes scheduling information for a PUCCH transmission. For example, the base station may transmit a DCI to a UE where the DCI indicates the resources to be used by the UE for the PUCCH transmission. In some examples, the configuration circuitry 2043 together with the communication and processing circuitry 2041 and the transceiver 2010, shown and described above in connection with FIG. 20, may provide a means to transmit a DCI.

At optional block 1208, the base station may receive the PUCCH transmission without frequency hopping if the configuration (determined at block 1204) specifies that frequency hopping is not to be used for PUCCH transmissions for narrowband wireless communication. In some examples, the configuration circuitry 2043 together with the communication and processing circuitry 2041 and the transceiver 2010, shown and described above in connection with FIG. 20, may provide a means to receive the PUCCH transmission.

At optional block 1210, the base station may use a frequency hopping pattern specified by the configuration (determined at block 1204) for receiving the PUCCH transmission. For example, one frequency hopping pattern may be specified for narrowband wireless communication and another frequency hopping pattern specified for wideband wireless communication. In some examples, the configuration circuitry 2043 together with the communication and processing circuitry 2041 and the transceiver 2010, shown and described above in connection with FIG. 20, may provide a means to use a frequency hopping pattern.

Figure 13:
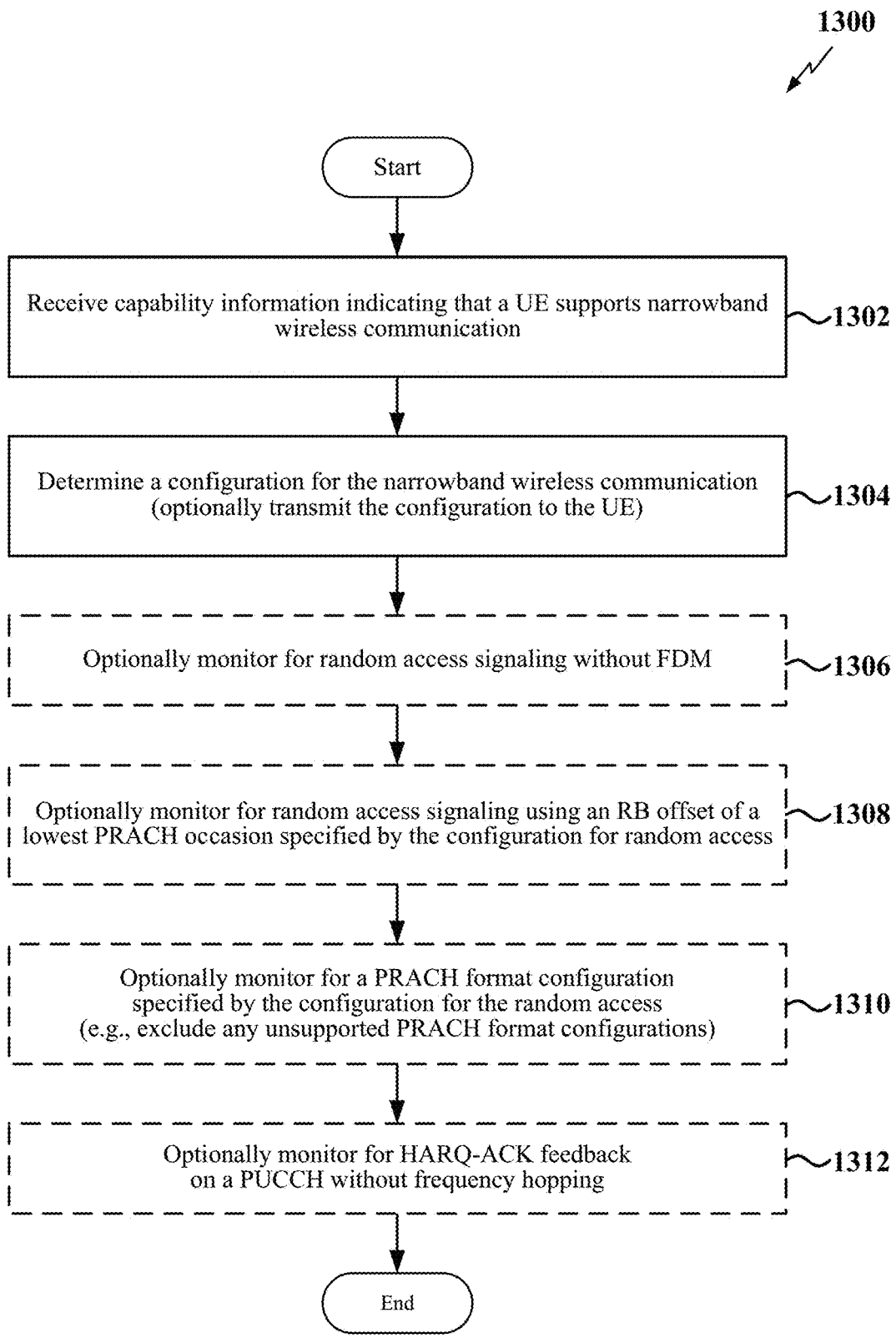
FIG. 13 is a flowchart illustrating an example of a method for narrowband random access communication by a base station according to some aspects.

FIG. 13 is a flow chart illustrating an example method for wireless communication 1300 according to some aspects of the disclosure. As described herein, some or all illustrated features may be omitted in a particular implementation within the scope of the present disclosure, and some illustrated features may not be required for implementation of all examples. In some examples, the method for wireless communication 1300 may be carried out by the BS 2000 illustrated in FIG. 20. In some examples, the method for wireless communication 1300 may be carried out by any suitable apparatus or means for carrying out the functions or algorithm described below.

At block 1302, a base station receives capability information indicating that a UE supports narrowband wireless communication. For example, the base station may receive a UE capabilities message from a UE including an indication that the UE supports a 3 MHz band and/or a 3.6 MHz band. In some examples, the capability circuitry 2042 together with the communication and processing circuitry 2041 and the transceiver 2010, shown and described above in connection with FIG. 20, may provide a means to receive capability information.

At block 1304, the base station determines a configuration for the narrowband wireless communication (e.g., a narrowband configuration defined by a wireless communication standard). In some examples, the base station may transmit the configuration to a UE. In some examples, the configuration circuitry 2043, shown and described above in connection with FIG. 20, may provide a means to determine a configuration.

At optional block 1306, the base station may monitor for random access signaling without FDM if the configuration (determined at block 1304) specifies that FDM is not to be used for random access for narrowband wireless communication. In some examples, the configuration circuitry 2043 together with the communication and processing circuitry 2041 and the transceiver 2010, shown and described above in connection with FIG. 20, may provide a means to monitor for random access signaling.

At optional block 1308, the base station may monitor for random access signaling using an RB offset of a lowest PRACH occasion specified by the configuration (determined at block 1304) for random access. For example, one RB offset may be specified for narrowband wireless communication and another RB offset specified for wideband wireless communication. In some examples, the configuration circuitry 2043 together with the communication and processing circuitry 2041 and the transceiver 2010, shown and described above in connection with FIG. 20, may provide a means to monitor for random access signaling.

At optional block 1310, the base station may monitor for a PRACH format configuration specified by the configuration (determined at block 1304) for the random access. For example, the base station may exclude any unsupported PRACH format configurations. In some examples, the configuration circuitry 2043 together with the communication and processing circuitry 2041 and the transceiver 2010, shown and described above in connection with FIG. 20, may provide a means to monitor for a PRACH format configuration.

At optional block 1312, the base station may monitor for HARQ-ACK feedback on a PUCCH without frequency hopping if this is specified by the configuration (determined at block 1304). In some examples, the configuration circuitry 2043 together with the communication and processing circuitry 2041 and the transceiver 2010, shown and described above in connection with FIG. 20, may provide a means to monitor for HARQ-ACK feedback.

Figure 14:
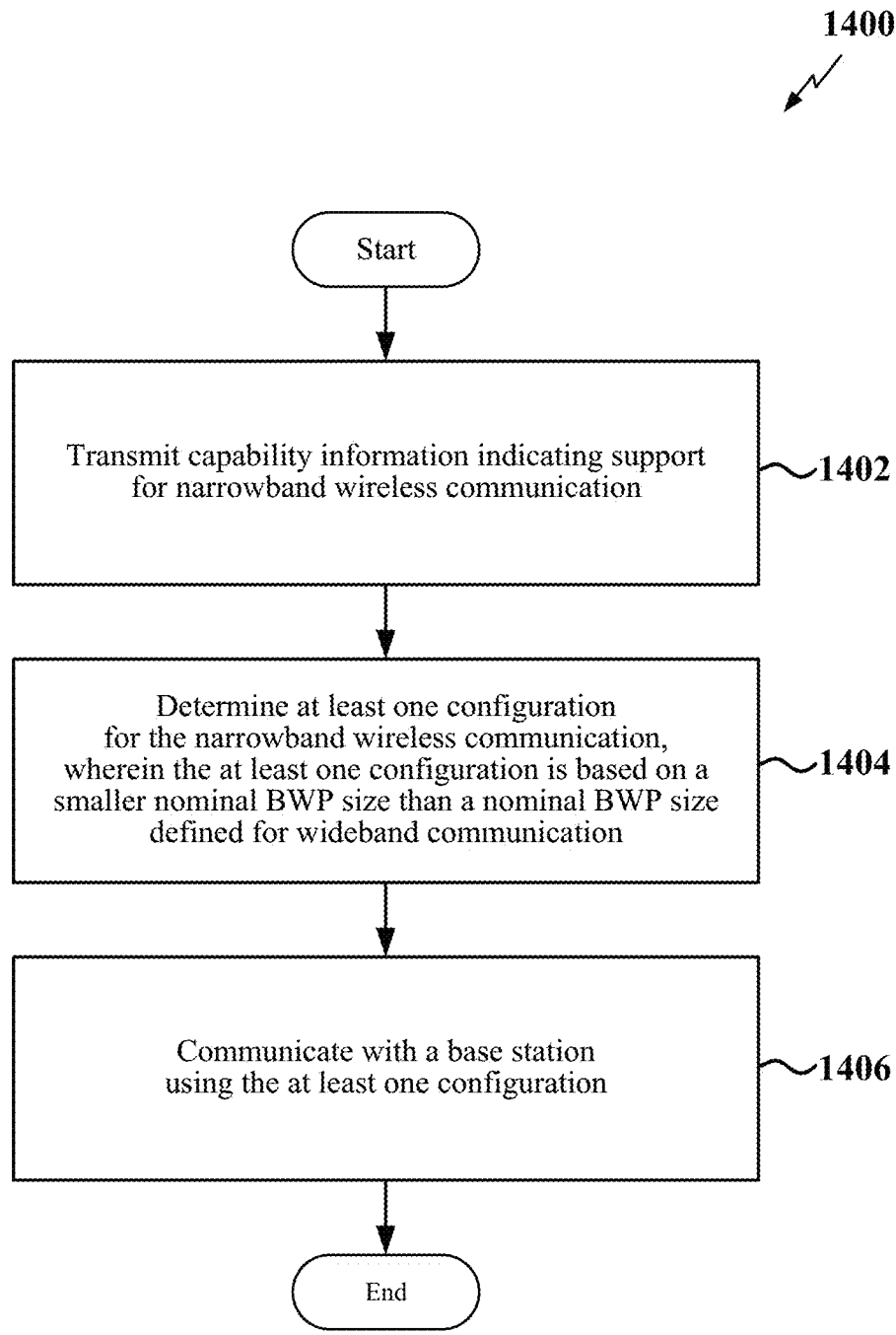
FIG. 14 is a flowchart illustrating an example of a method for narrowband wireless communication by a user equipment according to some aspects.

FIG. 14 is a flow chart illustrating an example method for wireless communication 1400 according to some aspects of the disclosure. As described herein, some or all illustrated features may be omitted in a particular implementation within the scope of the present disclosure, and some illustrated features may not be required for implementation of all examples. In some examples, the method for wireless communication 1400 may be carried out by the UE 1600 illustrated in FIG. 16. In some examples, the method for wireless communication 1400 may be carried out by any suitable apparatus or means for carrying out the functions or algorithm described below.

At block 1402, a UE transmits capability information indicating support for narrowband wireless communication. For example, the UE may transmit a UE capabilities message including an indication that the UE supports a 3 MHz band and/or a 3.6 MHz band. In some examples, the capability circuitry 1642 together with the communication and processing circuitry 1641 and the transceiver 1610, shown and described above in connection with FIG. 16, may provide a means to transmit capability information.

At block 1404, the UE determines at least one configuration for the narrowband wireless communication. In this case, the at least one configuration is based on a smaller nominal BWP size (e.g., 3 GHz or 3.6 GHz) than a nominal BWP size defined for wideband communication (e.g., 5 GHz). Thus, the BWP size used for downlink and uplink signaling is adjusted according to the smaller nominal BWP size. In some examples, the configuration circuitry 1643, shown and described above in connection with FIG. 16, may provide a means to determine at least one configuration.

At block 1406, the UE communicates with a base station using the at least one configuration (e.g., using the flexible uplink and downlink bandwidth). In some examples, the configuration circuitry 1643 together with the communication and processing circuitry 1641 and the transceiver 1610, shown and described above in connection with FIG. 16, may provide a means to communicate with a base station.

Figure 15:
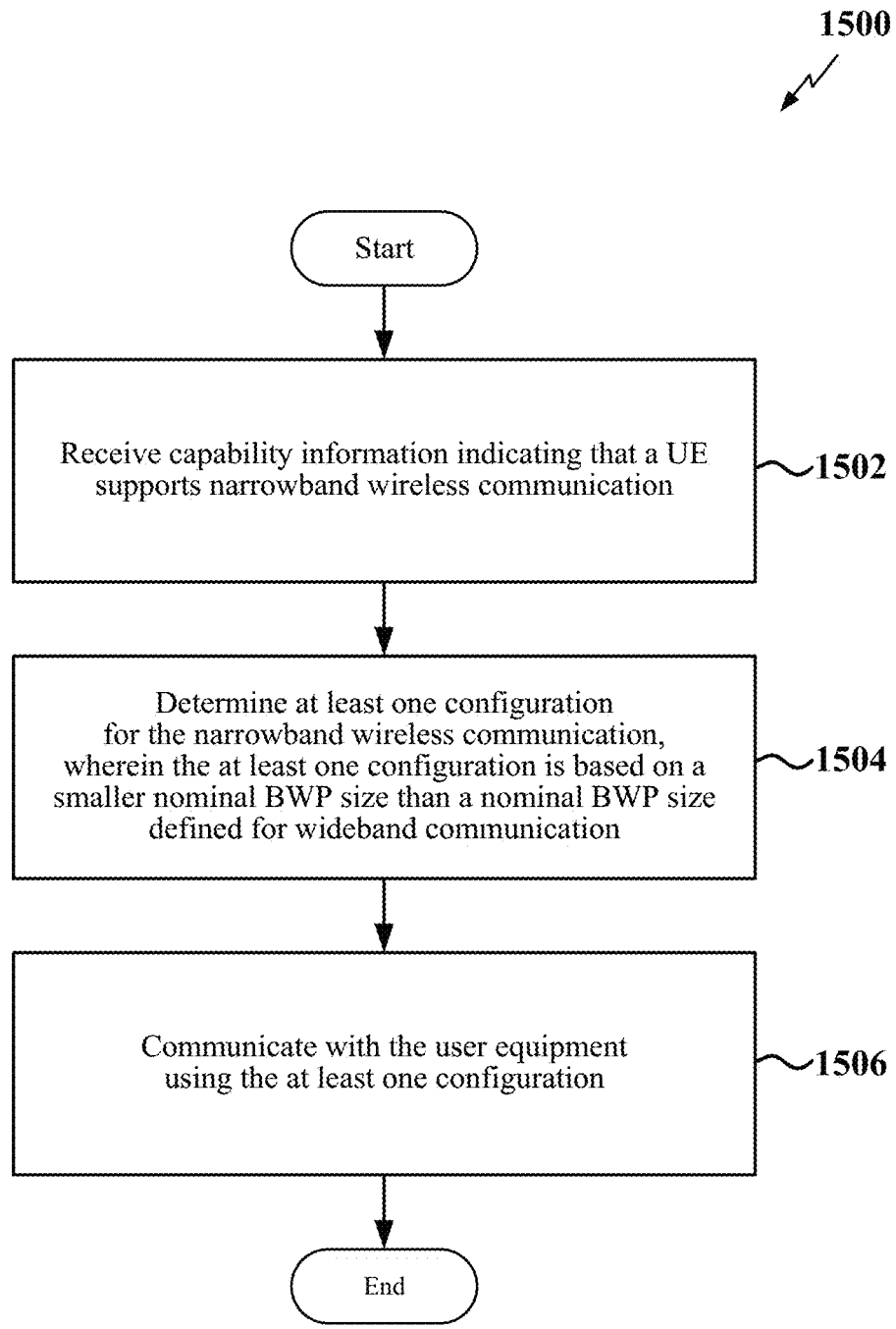
FIG. 15 is a flowchart illustrating an example of a method for narrowband wireless communication by a base station according to some aspects.

FIG. 15 is a flow chart illustrating an example method for wireless communication 1500 according to some aspects of the disclosure. As described herein, some or all illustrated features may be omitted in a particular implementation within the scope of the present disclosure, and some illustrated features may not be required for implementation of all examples. In some examples, the method for wireless communication 1500 may be carried out by the BS 2000 illustrated in FIG. 20. In some examples, the method for wireless communication 1500 may be carried out by any suitable apparatus or means for carrying out the functions or algorithm described below.

At block 1502, a base station receives capability information indicating that a UE supports narrowband wireless communication. For example, the base station may receive a UE capabilities message from a UE including an indication that the UE supports a 3 MHz band and/or a 3.6 MHz band. In some examples, the capability circuitry 2042 together with the communication and processing circuitry 2041 and the transceiver 2010, shown and described above in connection with FIG. 20, may provide a means to receive capability information.

At block 1504, the base station determines at least one configuration for the narrowband wireless communication. In this case, the at least one configuration is based on a smaller nominal BWP size (e.g., 3 GHz or 3.6 GHz) than a nominal BWP size defined for wideband communication (e.g., 5 GHz). Thus, the BWP size used for downlink and uplink signaling is adjusted according to the smaller nominal BWP size. In some examples, the configuration circuitry 2043, shown and described above in connection with FIG. 20, may provide a means to determine at least one configuration.

At block 1506, the base station communicates with a UE using the at least one configuration (e.g., using the flexible uplink and downlink bandwidth). In some examples, the configuration circuitry 2043 together with the communication and processing circuitry 2041 and the transceiver 2010, shown and described above in connection with FIG. 20, may provide a means to communicate with a UE.

Figure 16:
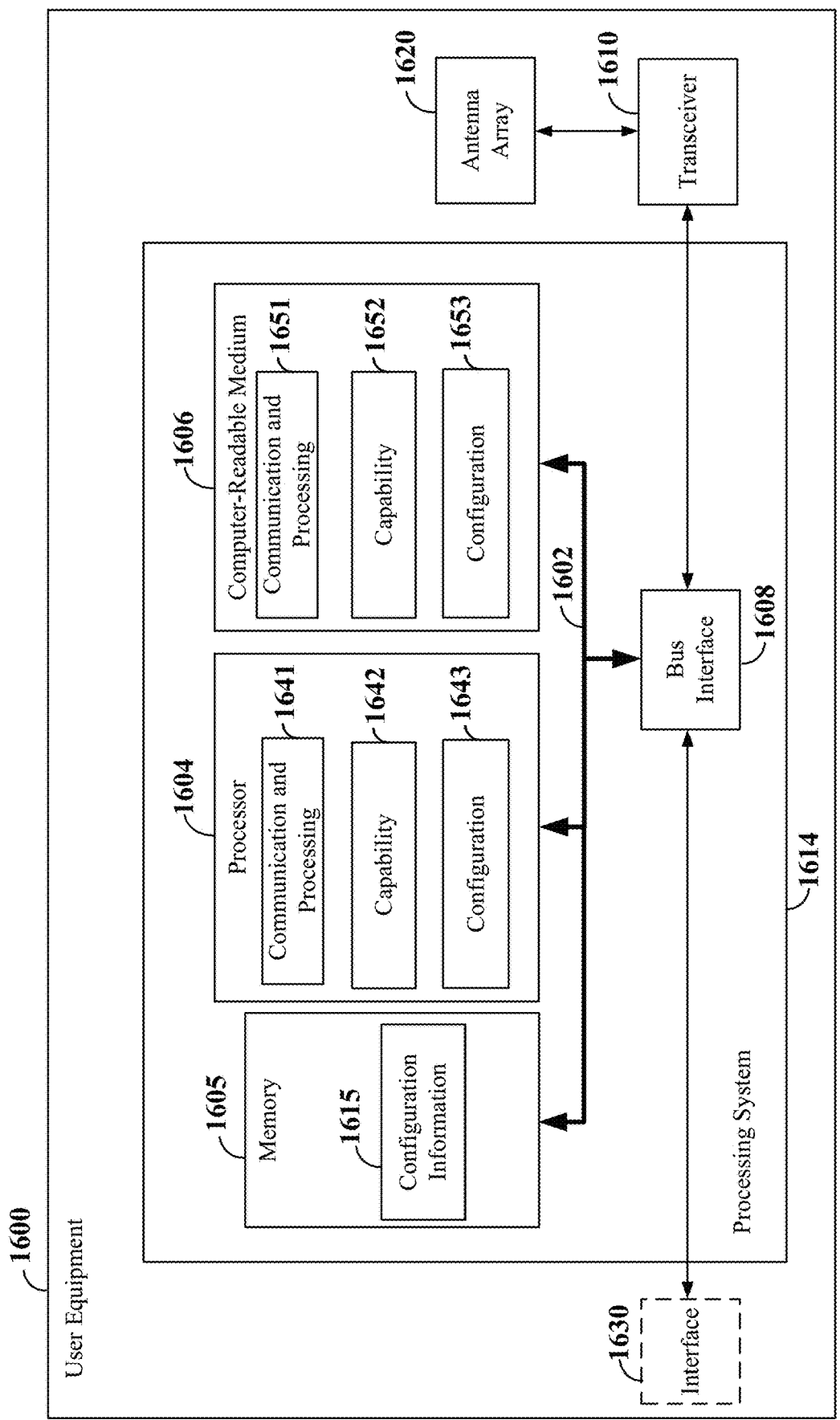
FIG. 16 is a block diagram illustrating an example of a hardware implementation for a user equipment employing a processing system according to some aspects.

FIG. 16 is a block diagram illustrating an example of a hardware implementation for a UE 1600 employing a processing system 1614. For example, the UE 1600 may be a device configured to wirelessly communicate with a base station, as discussed in any one or more of FIGS. 1-15. In some implementations, the UE 1600 may correspond to any of the UEs or scheduled entities shown in any of FIGS. 1, 2, and 5.

In accordance with various aspects of the disclosure, an element, or any portion of an element, or any combination of elements may be implemented with the processing system 1614. The processing system 1614 may include one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1600 may be configured to perform any one or more of the functions described herein. That is, the processor 1604, as utilized in a UE 1600, may be used to implement any one or more of the processes and procedures described herein.

The processor 1604 may in some instances be implemented via a baseband or modem chip and in other implementations, the processor 1604 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610 and between the bus 1602 and an interface 1630. The transceiver 1610 provides a communication interface or means for communicating with various other apparatus over a wireless transmission medium. In some examples, the UE may include two or more transceivers 1610 (e.g., for communicating via one or more RF bands). The interface 1630 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1630 may include a user interface (e.g., keypad, display, speaker, microphone, joystick). Of course, such a user interface is optional, and may be omitted in some examples, such as an IoT device.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, the memory 1605 may store configuration information 1615 (e.g., configuration information specified by a standard and/or received from a base station) used by the processor 1604 in cooperation with the transceiver 1610 for narrowband wireless communication.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1600 may be configured to perform any one or more of the operations described herein (e.g., as described above in conjunction with FIGS. 1-15 and as described below in conjunction with FIGS. 17-19). In some aspects of the disclosure, the processor 1604, as utilized in the UE 1600, may include circuitry configured for various functions.

The processor 1604 may include communication and processing circuitry 1641. The communication and processing circuitry 1641 may be configured to communicate with a base station, such as a gNB. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains, each configured to process signals in a different RAT (or RAN) type. The communication and processing circuitry 1641 may further be configured to execute communication and processing software 1651 included on the computer-readable medium 1606 to implement one or more functions described herein.

In some examples, the communication and processing circuitry 1641 may be configured to receive and process downlink signals via the transceiver 1610 and an antenna array. For example, the communication and processing circuitry 1641 may be configured to receive a respective reference signal (e.g., an SSB or a CSI-RS) from the base station via the antenna array 1620.

In some examples, the communication and processing circuitry 1641 may further be configured to generate and transmit uplink signals via the transceiver 1610. For example, the communication and processing circuitry 1641 may be configured to transmit a respective reference signal (e.g., an SRS or a DMRS) to the base station via the antenna array 1620.

The communication and processing circuitry 1641 may further be configured to generate and transmit an uplink signal to the base station. The uplink signal may include, for example, a PUCCH, PUSCH, SRS, DMRS, or PRACH. In some examples, the signaling may take the form of a MAC-CE carried in a PUSCH, a UCI in a PUCCH or a PUSCH, a random access message, or an RRC message. The communication and processing circuitry 1641 may further be configured to generate and transmit a scheduling request (e.g., via UCI in a PUCCH) to the base station to receive an uplink grant for the PUSCH carrying the MAC-CE including the request.

In some examples (e.g., where the UE 1600 supports both narrowband communication and wideband communication), the communication and processing circuitry 1641 may be configured to receive and process downlink beamformed signals at a mmWave frequency or a sub-6 GHz frequency via the transceiver 1610 and the antenna array 1620. For example, the communication and processing circuitry 1641 may be configured to receive beamformed signals on each of a plurality of downlink beams from the base station via at least one antenna panel of the antenna array 1620.

In some examples, the communication and processing circuitry 1641 may further be configured to generate and transmit uplink beamformed signals at a mmWave frequency or a sub-6 GHz frequency via the transceiver 1610 and the antenna array 1620. For example, the communication and processing circuitry 1641 may be configured to transmit beamformed signals on each of a plurality of uplink beams to the base station via at least one antenna panel of the antenna array 1620.

In some implementations where the communication involves receiving information, the communication and processing circuitry 1641 may obtain information from a component of the UE 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations where the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

In some examples, the communication and processing circuitry 1641 may include functionality for a means for communicating with a base station via a first RF band according to a first configuration. For example, the communication and processing circuitry 1641 may cooperate with the transceiver 1610 to transmit information to a gNB via a narrowband uplink channel and/or receive information from a gNB via a narrowband downlink channel using one or more parameters or aspects specified by the first configuration (e.g., a BWP size, etc., as discussed herein).

The processor 1604 may include capability circuitry 1642 configured to perform capability-related operations as discussed herein (e.g., one or more of the operations described in conjunction with FIGS. 6-15). The capability circuitry 1642 may be configured to execute capability software 1652 included on the computer-readable medium 1606 to implement one or more functions described herein.

In some examples, the capability circuitry 1642 may include functionality for a means for receiving an indication that a base station supports a particular RF band. For example, the capability circuitry 1642 together with the communication and processing circuitry 1641 and the transceiver 1610 may receive a SIB or some other type of message indicating that a gNB supports narrowband communication.

In some examples, the capability circuitry 1642 may include functionality for a means for determining that the UE 1600 supports a minimum BWP size for narrowband wireless communication. For example, the capability circuitry 1642 may identify the UE as a multi-band UE that supports narrowband communication (e.g., a bandwidth that is less than 5 MHz) and/or wideband communication (e.g., a bandwidth of 5 MHz or higher) or identify the UE as a reduced capability UE (e.g., a UE that supports only narrowband communication).

In some examples, the capability circuitry 1642 may include functionality for a means for identifying an RF band supported by a base station. For example, the capability circuitry 1642 together with the communication and processing circuitry 1641 and the transceiver 1610 may monitor information transmitted by a gNB (e.g., a SIB) for an indication of the RF bands that the gNB uses for communicating with UEs. Accordingly, the capability circuitry 1642 may include functionality for a means for receiving an indication that a base station supports a particular RF band.

The processor 1604 may include configuration circuitry 1643 configured to perform configuration-related operations as discussed herein (e.g., one or more of the operations described in conjunction with FIGS. 6-15). The configuration circuitry 1643 may be configured to execute configuration software 1653 included on the computer-readable medium 1606 to implement one or more functions described herein.

In some examples, the configuration circuitry 1643 may include functionality for a means for selecting a configuration. For example, the configuration circuitry 1643 may obtain configuration information defined for narrowband communication (e.g., as specified by a wireless communication standard and/or as received from a gNB) that specifies, for example, certain parameters and/or actions to be taken (or not taken) for downlink communication (e.g., CSI-RS and/or TRS), uplink communication (e.g., PUCCH), random access, or a combination thereof.

In some examples, the configuration circuitry 1643 may include functionality for a means for identifying a BWP size. For example, the configuration circuitry 1643 may obtain configuration information defined for narrowband communication (e.g., as specified by a wireless communication standard and/or as received from a gNB) that specifies a minimum BWP size to be used for narrowband communication.

Figure 17:
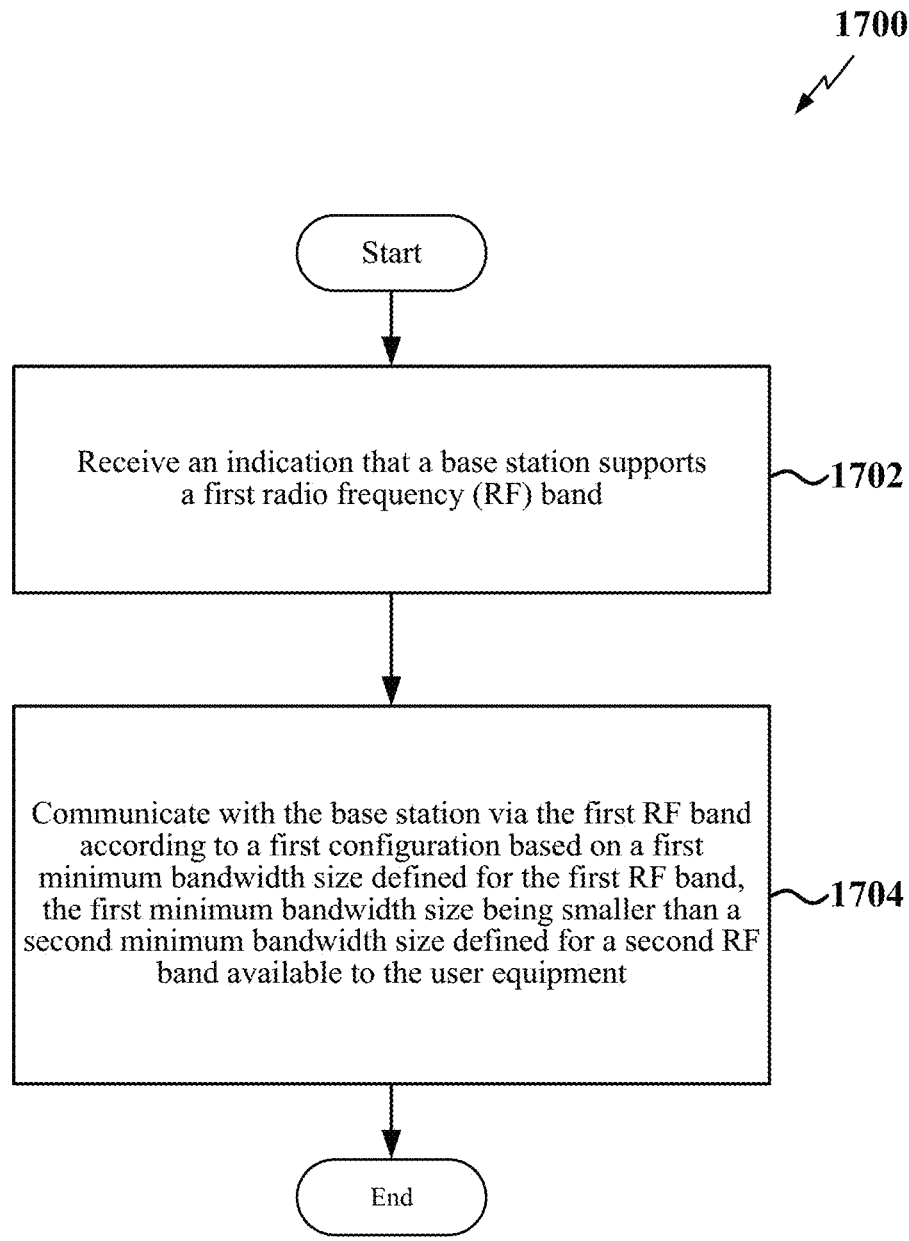
FIG. 17 is a flowchart illustrating an example method for narrowband wireless communication with a base station according to some aspects.

FIG. 17 is a flow chart illustrating an example method for wireless communication 1700 according to some aspects of the disclosure. As described herein, some or all illustrated features may be omitted in a particular implementation within the scope of the present disclosure, and some illustrated features may not be required for implementation of all examples. In some examples, the method for wireless communication 1700 may be carried out by the UE 1600 illustrated in FIG. 16. In some examples, the method for wireless communication 1700 may be carried out by any suitable apparatus or means for carrying out the functions or algorithm described below.

At block 1702, a user equipment may receive an indication that a base station supports a first radio frequency (RF) band. For example, the capability circuitry 1642 together with the communication and processing circuitry 1641 and the transceiver 1610, shown and described above in connection with FIG. 16, may provide a means to receive an indication that a base station supports a first radio frequency (RF) band.

At block 1704, the user equipment may communicate with the base station via the first RF band according to a first configuration based on a first minimum bandwidth size defined for the first RF band, the first minimum bandwidth size being smaller than a second minimum bandwidth size defined for a second RF band available to the user equipment. For example, the configuration circuitry 1643 together with the communication and processing circuitry 1641 and the transceiver 1610, shown and described above in connection with FIG. 16, may provide a means to communicate with the base station via the first RF band according to a first configuration based on a first minimum bandwidth size defined for the first RF band.

In some examples, the first minimum bandwidth size is a first minimum bandwidth part size and the second minimum bandwidth size is a second minimum bandwidth part size. In some examples, the second minimum bandwidth part size is 5 megahertz (MHz), and the first minimum bandwidth part size is 3 MHz or 3.6 MHz.

In some examples, the first radio frequency band is at least one of a future railway mobile communication system band or a broadband services band. In some examples, the first radio frequency band is a 900 megahertz (MHz) band.

In some examples, the first configuration may include a minimum number of resource blocks (RBs) for a channel state information-reference signal (CSI-RS). In some examples, communicating with the base station via the first RF band according to the first configuration may include receiving the CSI-RS via at least the minimum number of RBs.

In some examples, the first configuration may include a minimum number of resource blocks (RBs) for a tracking reference signal (TRS). In some examples communicating with the base station via the first RF band according to the first configuration may include receiving the TRS via at least the minimum number of RBs.

In some examples, the first configuration specifies that transmission of a tracking reference signal (TRS) is disabled. In some examples, the user equipment may determine a quasi co-location (QCL) relation for a physical downlink shared channel (PDSCH) demodulation reference signal (DMRS) based on a synchronization signal block (SSB) instead of the TRS.

In some examples, the first configuration specifies that use of at least one specified modulation and coding scheme (MCS) value is restricted. In some examples, communicating with the base station via the first RF band according to the first configuration may include abstaining from (abstain from) using the at least one specified modulation and coding scheme value when communicating with the base station via the first RF band.

In some examples, the first configuration may include a first frequency hopping pattern for uplink signal transmission (e.g., PUCCH transmission, PUSCH transmission, etc.) defined for the first RF band, and the first frequency hopping pattern is different from a second frequency hopping pattern defined for the second RF band. In some examples, communicating with the base station via the first RF band according to the first configuration may include transmitting on an uplink channel (e.g., PUCCH, PUSCH, etc.) using the first frequency hopping pattern.

In some examples, the first configuration may include a first physical uplink control channel (PUCCH) frequency hopping pattern defined for the first RF band, and the first PUCCH frequency hopping pattern is different from a second PUCCH frequency hopping pattern defined for the second RF band. In some examples, communicating with the base station via the first RF band according to the first configuration may include transmitting on a PUCCH using the first PUCCH frequency hopping pattern.

In some examples, the first configuration specifies that frequency hopping for uplink signal transmission (e.g., PUCCH transmission, PUSCH transmission, etc.) is disabled. In some examples, communicating with the base station via the first RF band according to the first configuration may include abstaining from using frequency hopping when transmitting on (e.g., for transmitting on) an uplink channel (e.g., PUCCH, PUSCH, etc.).

In some examples, the first configuration specifies that physical uplink control channel (PUCCH) frequency hopping is disabled. In some examples, communicating with the base station via the first RF band according to the first configuration may include abstaining from using frequency hopping when transmitting on a PUCCH.

In some examples, the first configuration may include a first resource block (RB) offset for a physical random access channel (PRACH) occasion defined within the first RF band, and the first RB offset is different from a second RB offset of a PRACH occasion defined within the second RF band. In some examples, communicating with the base station via the first RF band according to the first configuration may include transmitting on a PRACH using the first RB offset.

In some examples, the first configuration specifies that frequency division multiplexing (FDM) is disabled for a physical random access channel (PRACH) resource allocation. In some examples, communicating with the base station via the first RF band according to the first configuration may include abstaining from using frequency division multiplexed (FDMed) resources when transmitting on a PRACH.

In some examples, the first configuration specifies that at least one specified physical random access channel (PRACH) format is disabled. In some examples, communicating with the base station via the first RF band according to the first configuration may include abstaining from using the at least one specified PRACH format when transmitting on a PRACH.

In some examples, the first configuration specifies that physical uplink control channel (PUCCH) frequency hopping is disabled for hybrid automatic repeat request (HARQ) feedback. In some examples, communicating with the base station via the first RF band according to the first configuration may include abstaining from using frequency hopping when transmitting HARQ feedback.

In some examples, the user equipment may transmit a capability message indicating that the user equipment supports communication on the first RF band.

Figure 18:
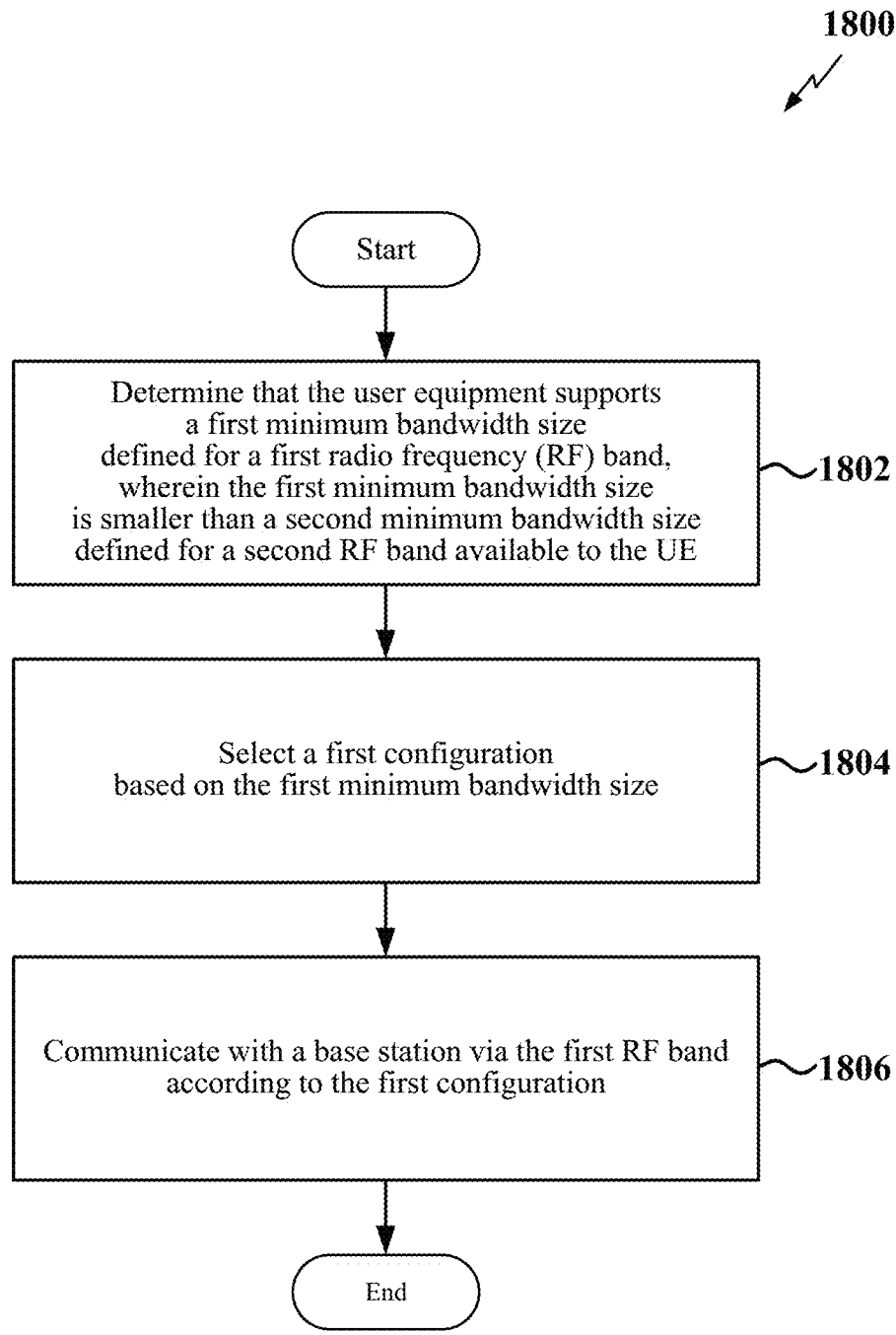
FIG. 18 is a flowchart illustrating another example method for narrowband wireless communication with a base station according to some aspects.

FIG. 18 is a flow chart illustrating an example method for wireless communication 1800 according to some aspects of the disclosure. As described herein, some or all illustrated features may be omitted in a particular implementation within the scope of the present disclosure, and some illustrated features may not be required for implementation of all examples. In some examples, the method for wireless communication 1800 may be carried out by the UE 1600 illustrated in FIG. 16. In some examples, the method for wireless communication 1800 may be carried out by any suitable apparatus or means for carrying out the functions or algorithm described below.

At block 1802, a user equipment may determine that the user equipment supports a first minimum bandwidth size defined for a first radio frequency (RF) band, wherein the first minimum bandwidth size is smaller than a second minimum bandwidth size defined for a second RF band available to the UE. For example, the capability circuitry 1642, shown and described above in connection with FIG. 16, may provide a means to determine that the user equipment supports a first minimum bandwidth size defined for a first radio frequency (RF) band.

In some examples, the first minimum bandwidth size is a first minimum bandwidth part size and the second minimum bandwidth size is a second minimum bandwidth part size. In some examples, the second minimum bandwidth part size is 5 megahertz (MHz), and the first minimum bandwidth part size is 3 MHz or 3.6 MHz.

In some examples, the first radio frequency band is at least one of a future railway mobile communication system band or a broadband services band. In some examples, the first radio frequency band is a 900 megahertz (MHz) band.

At block 1804, the user equipment may select a first configuration based on the first minimum bandwidth size. For example, the configuration circuitry 1643, shown and described above in connection with FIG. 16, may provide a means to select a first configuration based on the first minimum bandwidth size.

At block 1806, the user equipment may communicate with a base station via the first RF band according to the first configuration. For example, the communication and processing circuitry 1641 and the transceiver 1610, shown and described above in connection with FIG. 16, may provide a means to communicate with a base station via the first RF band according to the first configuration.

In some examples, the first configuration may include a minimum number of resource blocks (RBs) for a channel state information-reference signal (CSI-RS). In some examples, communicating with the base station via the first RF band according to the first configuration may include receiving the CSI-RS via at least the minimum number of RBs.

In some examples, the first configuration may include a minimum number of resource blocks (RBs) for a tracking reference signal (TRS). In some examples communicating with the base station via the first RF band according to the first configuration may include receiving the TRS via at least the minimum number of RBs.

In some examples, the first configuration specifies that transmission of a tracking reference signal (TRS) is disabled. In some examples, the user equipment may determine a quasi co-location (QCL) relation for a physical downlink shared channel (PDSCH) demodulation reference signal (DMRS) based on a synchronization signal block (SSB) instead of the TRS.

In some examples, the first configuration specifies that use of at least one specified modulation and coding scheme (MCS) value is restricted. In some examples, communicating with the base station via the first RF band according to the first configuration may include abstaining from using the at least one specified modulation and coding scheme value when communicating with the base station via the first RF band.

In some examples, the first configuration may include a first frequency hopping pattern for uplink signal transmission (e.g., PUCCH transmission, PUSCH transmission, etc.) defined for the first RF band, and the first frequency hopping pattern is different from a second frequency hopping pattern defined for the second RF band. In some examples, communicating with the base station via the first RF band according to the first configuration may include transmitting on an uplink channel (e.g., PUCCH, PUSCH, etc.) using the first frequency hopping pattern.

In some examples, the first configuration may include a first physical uplink control channel (PUCCH) frequency hopping pattern defined for the first RF band, and the first PUCCH frequency hopping pattern is different from a second PUCCH frequency hopping pattern defined for the second RF band. In some examples, communicating with the base station via the first RF band according to the first configuration may include transmitting on a PUCCH using the first PUCCH frequency hopping pattern.

In some examples, the first configuration specifies that frequency hopping for uplink signal transmission (e.g., PUCCH transmission, PUSCH transmission, etc.) is disabled. In some examples, communicating with the base station via the first RF band according to the first configuration may include abstaining from using frequency hopping when transmitting on an uplink channel (e.g., PUCCH, PUSCH, etc.).

In some examples, the first configuration specifies that physical uplink control channel (PUCCH) frequency hopping is disabled. In some examples, communicating with the base station via the first RF band according to the first configuration may include abstaining from using frequency hopping when transmitting on a PUCCH.

In some examples, the first configuration may include a first resource block (RB) offset for a physical random access channel (PRACH) occasion defined within the first RF band, and the first RB offset is different from a second RB offset of a PRACH occasion defined within the second RF band. In some examples, communicating with the base station via the first RF band according to the first configuration may include transmitting on a PRACH using the first RB offset.

In some examples, the first configuration specifies that frequency division multiplexing (FDM) is disabled for a physical random access channel (PRACH) resource allocation. In some examples, communicating with the base station via the first RF band according to the first configuration may include abstaining from using frequency division multiplexed (FDMed) resources when transmitting on a PRACH.

In some examples, the first configuration specifies that at least one specified physical random access channel (PRACH) format is disabled. In some examples, communicating with the base station via the first RF band according to the first configuration may include abstaining from using the at least one specified PRACH format when transmitting on a PRACH.

In some examples, the first configuration specifies that physical uplink control channel (PUCCH) frequency hopping is disabled for hybrid automatic repeat request (HARQ) feedback. In some examples, communicating with the base station via the first RF band according to the first configuration may include abstaining from using frequency hopping when transmitting HARQ feedback.

In some examples, the user equipment may transmit a capability message indicating that the user equipment supports communication on the first RF band.

Figure 19:
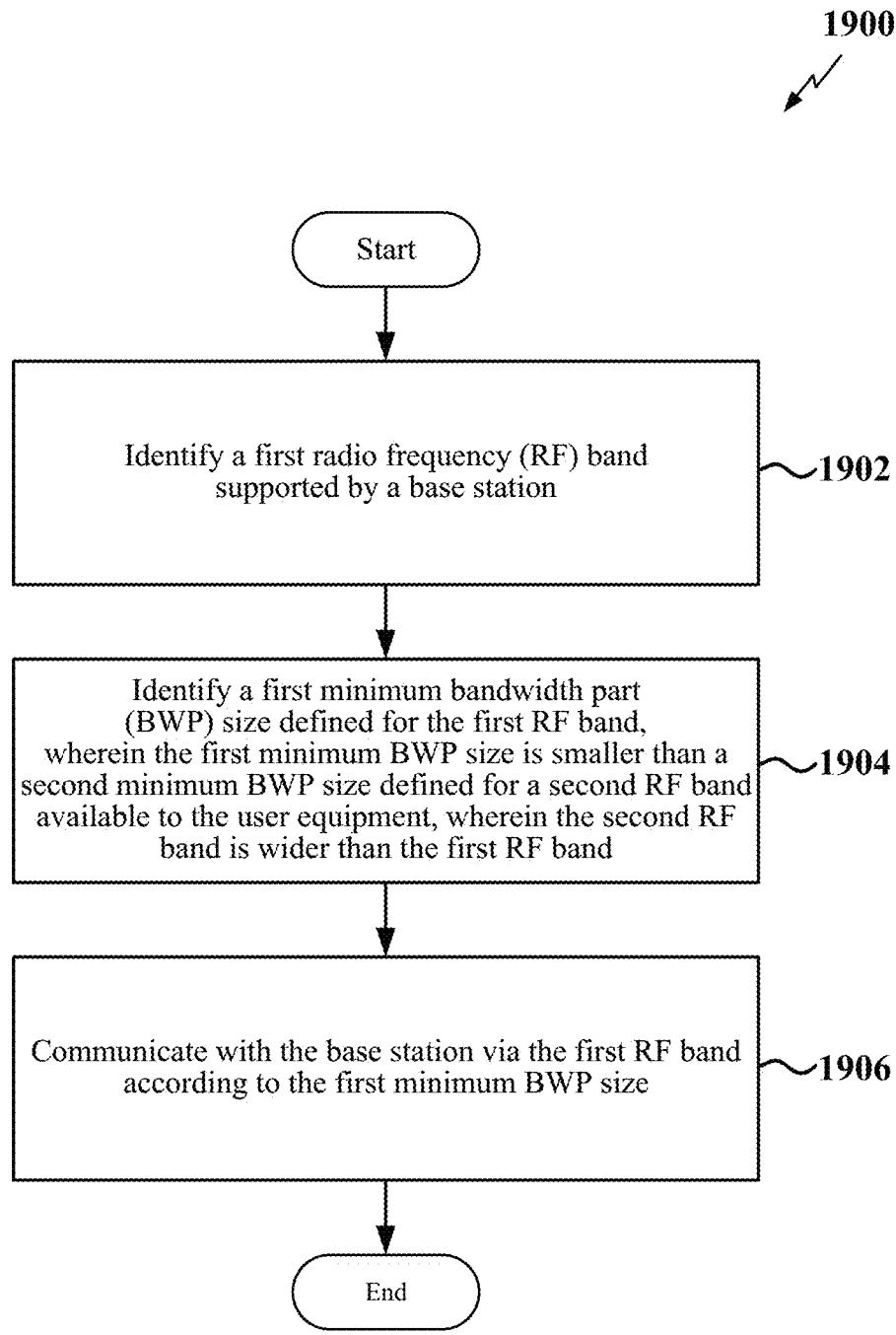
FIG. 19 is a flowchart illustrating another example method for narrowband wireless communication with a base station according to some aspects.

FIG. 19 is a flow chart illustrating an example method for wireless communication 1900 according to some aspects of the disclosure. As described herein, some or all illustrated features may be omitted in a particular implementation within the scope of the present disclosure, and some illustrated features may not be required for implementation of all examples. In some examples, the method for wireless communication 1900 may be carried out by the UE 1600 illustrated in FIG. 16. In some examples, the method for wireless communication 1900 may be carried out by any suitable apparatus or means for carrying out the functions or algorithm described below.

At block 1902, a user equipment may identify a first radio frequency (RF) band supported by a base station. For example, the capability circuitry 1642 together with the communication and processing circuitry 1641 and the transceiver 1610, shown and described above in connection with FIG. 16, may provide a means to identify a first radio frequency (RF) band supported by a base station.

At block 1904, the user equipment may identify a first minimum bandwidth part (BWP) size defined for the first RF band, wherein the first minimum BWP size is smaller than a second minimum BWP size defined for a second RF band available to the UE, wherein the second RF band is wider than the first RF band. For example, the configuration circuitry 1643, shown and described above in connection with FIG. 16, may provide a means to identify a first minimum bandwidth part (BWP) size defined for the first RF band.

At block 1906, the user equipment may communicate with the base station via the first RF band according to the first minimum BWP size. For example, the communication and processing circuitry 1641 and the transceiver 1610, shown and described above in connection with FIG. 16, may provide a means to communicate with the base station via the first RF band according to the first minimum BWP size.

In some examples, the first minimum BWP size is a minimum uplink BWP size. In some examples, communicating with the base station via the first RF band according to the first minimum BWP size may include transmitting information to the base station using at least the minimum uplink BWP size.

In some examples, the first minimum BWP size is a minimum downlink BWP size. In some examples, communicating with the base station via the first RF band according to the first minimum BWP size may include receiving information from the base station using at least the minimum downlink BWP size.

In some examples, a user equipment includes a transceiver, a memory, and a processor coupled to the transceiver and the memory. The processor and the memory may be configured to determine that the user equipment supports a first minimum bandwidth size defined for a first radio frequency (RF) band. The first minimum bandwidth size is smaller than a second minimum bandwidth size defined for a second RF band available to the user equipment. The processor and the memory may also be configured to select a first configuration based on the first minimum bandwidth size and communicate with a base station via the first RF band according to the first configuration.

In some examples, a method for wireless communication at a user equipment may include determining that the user equipment supports a first minimum bandwidth size defined for a first radio frequency (RF) band. The first minimum bandwidth size is smaller than a second minimum bandwidth size defined for a second RF band available to the user equipment. The method may also include selecting a first configuration based on the first minimum bandwidth size and communicating with a base station via the first RF band according to the first configuration.

In some examples, a user equipment may include means for determining that the user equipment supports a first minimum bandwidth size defined for a first radio frequency (RF) band. The first minimum bandwidth size is smaller than a second minimum bandwidth size defined for a second RF band available to the user equipment. The user equipment may also include means for selecting a first configuration based on the first minimum bandwidth size and means for communicating with a base station via the first RF band according to the first configuration.

In some examples, an article of manufacture for use by a user equipment may include a computer-readable medium having stored therein instructions executable by one or more processors of the user equipment to determine that the user equipment supports a first minimum bandwidth size defined for a first radio frequency (RF) band. The first minimum bandwidth size is smaller than a second minimum bandwidth size defined for a second RF band available to the user equipment. The computer-readable medium may also have stored therein instructions executable by one or more processors of the user equipment to select a first configuration based on the first minimum bandwidth size and communicate with a base station via the first RF band according to the first configuration.

In some examples, a user equipment that includes a transceiver, a memory, and a processor coupled to the transceiver and the memory. The processor and the memory may be configured to identify a first radio frequency (RF) band supported by a base station and identify a first minimum bandwidth part (BWP) size defined for the first RF band. The first minimum BWP size is smaller than a second minimum BWP size defined for a second RF band available to the user equipment. The second RF band is wider than the first RF band. The processor and the memory may be configured to communicate with the base station via the first RF band according to the first minimum BWP size.

In some examples, a method for wireless communication at a user equipment may include identifying a first radio frequency (RF) band supported by a base station and identifying a first minimum bandwidth part (BWP) size defined for the first RF band. The first minimum BWP size is smaller than a second minimum BWP size defined for a second RF band available to the user equipment. The second RF band is wider than the first RF band. The method may also include communicating with the base station via the first RF band according to the first minimum BWP size.

In some examples, a user equipment may include means for identifying a first radio frequency (RF) band supported by a base station and identifying a first minimum bandwidth part (BWP) size defined for the first RF band. The first minimum BWP size is smaller than a second minimum BWP size defined for a second RF band available to the user equipment. The second RF band is wider than the first RF band. The user equipment may also include means for communicating with the base station via the first RF band according to the first minimum BWP size.

In some examples, an article of manufacture for use by a user equipment may include a computer-readable medium having stored therein instructions executable by one or more processors of the user equipment to identify a first radio frequency (RF) band supported by a base station and identify a first minimum bandwidth part (BWP) size defined for the first RF band. The first minimum BWP size is smaller than a second minimum BWP size defined for a second RF band available to the user equipment. The second RF band is wider than the first RF band. The computer-readable medium may also have stored therein instructions executable by one or more processors of the user equipment to communicate with the base station via the first RF band according to the first minimum BWP size.

In one configuration, the UE 1600 includes means for receiving an indication that a base station supports a first radio frequency (RF) band, and means for communicating with the base station via the first RF band according to a first configuration based on a first minimum bandwidth size defined for the first RF band, the first minimum bandwidth size being smaller than a second minimum bandwidth size defined for a second RF band available to the user equipment. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 5, and 16, and utilizing, for example, the methods and/or algorithms described herein in relation to FIGS. 17-19.

Figure 20:
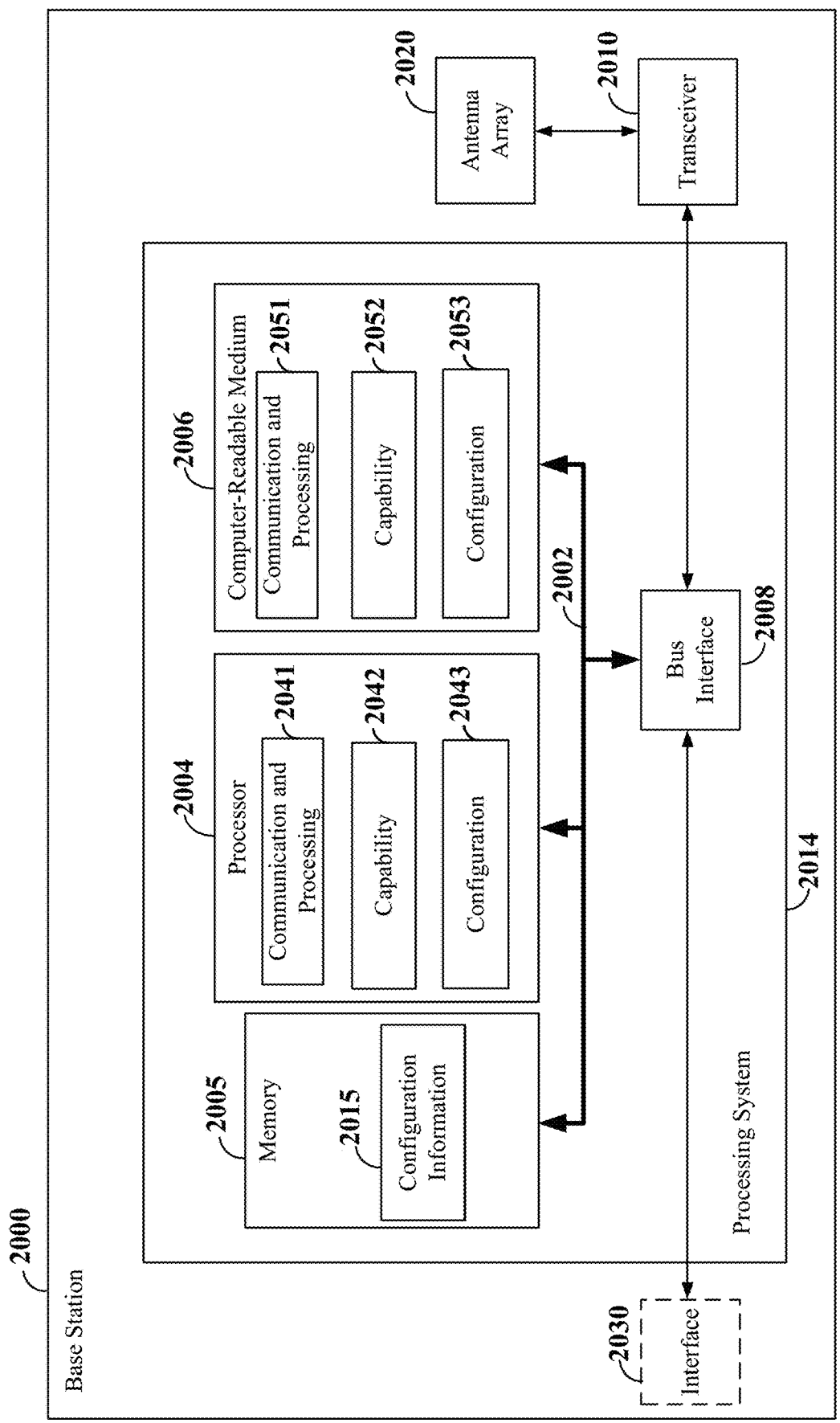
FIG. 20 is a block diagram illustrating an example of a hardware implementation for a base station employing a processing system according to some aspects.

FIG. 20 is a conceptual diagram illustrating an example of a hardware implementation for base station (BS) 2000 employing a processing system 2014. In some implementations, the BS 2000 may correspond to any of the BSs (e.g., gNBs) or scheduling entities shown in any of FIGS. 1, 2, and 5.

In accordance with various aspects of the disclosure, an element, or any portion of an element, or any combination of elements may be implemented with the processing system 2014. The processing system may include one or more processors 2004. The processing system 2014 may be substantially the same as the processing system 1614 illustrated in FIG. 16, including a bus interface 2008, a bus 2002, memory 2005, a processor 2004, and a computer-readable medium 2006. The memory 2005 may store configuration information 2015 (e.g., configuration information specified by a standard) used by the processor 2004 in cooperation with the transceiver 2010 for narrowband wireless communication. Furthermore, the BS 2000 may include an interface 2030 (e.g., a network interface) that provides a means for communicating with at least one other apparatus within a core network and with at least one radio access network.

The BS 2000 may be configured to perform any one or more of the operations described herein (e.g., as described above in conjunction with FIGS. 1-15 and as described below in conjunction with FIGS. 21-23). In some aspects of the disclosure, the processor 2004, as utilized in the BS 2000, may include circuitry configured for various functions.

The processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple UEs.

The processor 2004 may be configured to schedule resources for the transmission of downlink reference signals (e.g., SSBs or CSI-RSs) (e.g., on a plurality of downlink beams for a downlink beam sweep). The processor 2004 may further be configured to schedule resources for the uplink transmission of uplink reference signals (e.g., SRSs) (e.g., on a plurality of uplink beams for an uplink beam sweep). The processor 2004 may further be configured to schedule resources that may be utilized by the UE to transmit uplink signals. For example, resources may be scheduled for transmission of a PUCCH, PUSCH, PRACH occasion or RRC message. In some examples, the processor 2004 may be configured to schedule PUSCH resources in response to receiving a scheduling request from the UE.

In some aspects of the disclosure, the processor 2004 may include communication and processing circuitry 2041. The communication and processing circuitry 2044 may be configured to communicate with a UE. The communication and processing circuitry 2041 may include one or more hardware components that provide the physical structure that performs various processes related to communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. The communication and processing circuitry 2041 may further be configured to execute communication and processing software 2051 included on the computer-readable medium 2006 to implement one or more functions described herein.

The communication and processing circuitry 2041 may further be configured to receive an uplink signal from the UE. The uplink signal may include, for example, a PUCCH, PUSCH, SRS, DMRS, or PRACH. In some examples, the uplink signal may take the form of a MAC-CE carried in a PUSCH, a UCI in a PUCCH or PUSCH, a random access message, or an RRC message. The communication and processing circuitry 2041 may further be configured to receive a scheduling request (e.g., via UCI in a PUCCH) from the UE for an uplink grant for the PUSCH.

In some examples (e.g., where the BS 2000 supports both narrowband communication and wideband communication), the communication and processing circuitry 2041 may further be configured to generate and transmit downlink beamformed signals at a mmWave frequency or a sub-6 GHz frequency via the transceiver 2010 and the antenna array 2020. For example, the communication and processing circuitry 2041 may be configured to transmit a respective downlink reference signal (e.g., SSB or CSI-RS) on each of a plurality of downlink beams to the UE via at least one first antenna panel of the antenna array 2020.

The communication and processing circuitry 2041 may further be configured to receive an uplink signal on one or more uplink receive beams at a mmWave frequency or a sub-6 GHz frequency via the transceiver 2010 and the antenna array 2020. For example, the communication and processing circuitry 2041 may be configured to receive the uplink signal on one or more uplink receive beams via at least one first antenna panel of the antenna array 2020.

In some implementations wherein the communication involves receiving information, the communication and processing circuitry 2041 may obtain information from a component of the BS 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may include functionality for a means for receiving. In some examples, the communication and processing circuitry 2041 may include functionality for a means for decoding.

In some implementations wherein the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may include functionality for a means for sending (e.g., a means for transmitting). In some examples, the communication and processing circuitry 2041 may include functionality for a means for encoding.

In some examples, the communication and processing circuitry 2041 may include functionality for a means for communicating with a user equipment via a first RF band according to a first configuration. For example, the communication and processing circuitry 2041 may cooperate with the transceiver 2010 to transmit information to a UE via a narrowband downlink channel and/or receive information from a UE via a narrowband uplink channel using one or more parameters or aspects specified by the first configuration (e.g., a BWP size, etc., as discussed herein).

The processor 2004 may include capability circuitry 2042 configured to perform capability-related operations as discussed herein (e.g., one or more of the operations described in conjunction with FIGS. 6-15). The capability circuitry 2042 may be configured to execute capability software 2052 included on the computer-readable medium 2006 to implement one or more functions described herein.

In some examples, the capability circuitry 2042 may include functionality for a means for transmitting an indication that the base station 2000 supports a particular RF band. For example, the capability circuitry 2042 together with the communication and processing circuitry 2041 and the transceiver 2010 may broadcast a SIB or some other type of message indicating that the base station 2000 supports narrowband communication.

In some examples, the capability circuitry 2042 may include functionality for a means for determining that a UE supports a minimum BWP size for narrowband wireless communication. For example, the capability circuitry 2042 together with the communication and processing circuitry 2041 and the transceiver 2010 may receive a capability message from a UE indicating that the UE is a multi-band UE that supports narrowband communication (e.g., a bandwidth that is less than 5 MHz) and/or wideband communication (e.g., a bandwidth of 5 MHz or higher) or indicating that the UE is a reduced capability UE (e.g., a UE that supports only narrowband communication).

In some examples, the capability circuitry 2042 may include functionality for a means for determining that a UE supports an RF band. For example, the capability circuitry 2042 together with the communication and processing circuitry 2041 and the transceiver 2010 may receive a capability message from a UE indicating that the UE is a multi-band UE that supports narrowband communication (e.g., a bandwidth that is less than 5 MHz) and/or wideband communication (e.g., a bandwidth of 5 MHz or higher) or indicating that the UE is a reduced capability UE (e.g., a UE that supports only narrowband communication).

The processor 2004 may include configuration circuitry 2043 configured to perform configuration-related operations as discussed herein (e.g., one or more of the operations described in conjunction with FIGS. 6-15). The configuration circuitry 2043 may be configured to execute configuration software 2053 included on the computer-readable medium 2006 to implement one or more functions described herein.

In some examples, the configuration circuitry 2043 may include functionality for a means for selecting a configuration. For example, the configuration circuitry 2043 may obtain from the memory 2005 configuration information defined for narrowband communication (e.g., as specified by a wireless communication standard and/or as received from a gNB) that specifies, for example, certain parameters and/or actions to be taken (or not taken) for downlink communication (e.g., CSI-RS and/or TRS), uplink communication (e.g., PUCCH), random access, or a combination thereof.

In some examples, the configuration circuitry 2043 may include functionality for a means for identifying a BWP size. For example, the configuration circuitry 2043, shown and described above in connection with FIG. 20, may obtain from the memory 2005 configuration information defined for narrowband communication (e.g., as specified by a wireless communication standard) that specifies a minimum BWP size to be used for narrowband communication.

Figure 21:
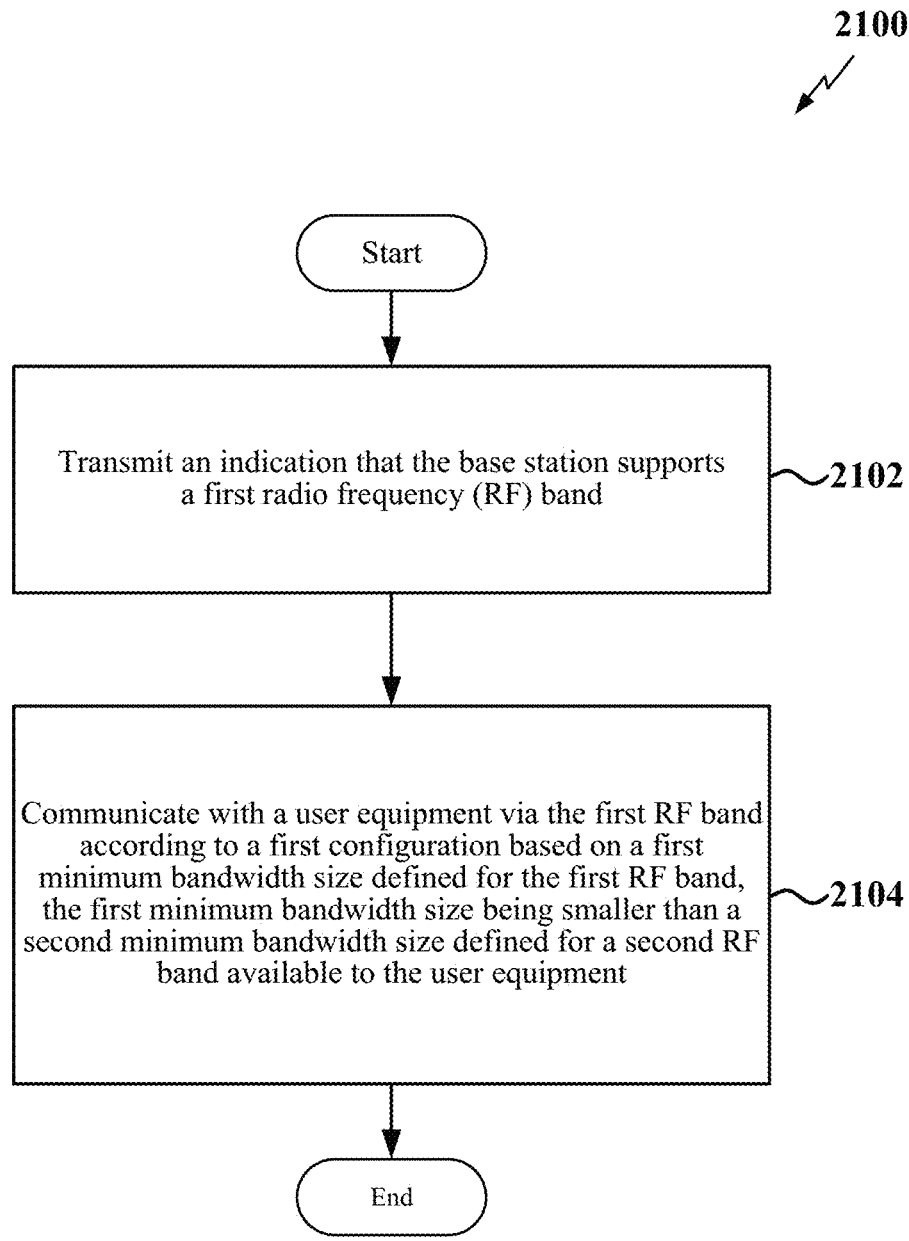
FIG. 21 is a flowchart illustrating an example method for narrowband wireless communication with a user equipment according to some aspects.

FIG. 21 is a flow chart illustrating an example method for wireless communication 2100 according to some aspects of the disclosure. As described herein, some or all illustrated features may be omitted in a particular implementation within the scope of the present disclosure, and some illustrated features may not be required for implementation of all examples. In some examples, the method for wireless communication 2100 may be carried out by the BS 2000 illustrated in FIG. 20. In some examples, the method for wireless communication 2100 may be carried out by any suitable apparatus or means for carrying out the functions or algorithm described below.

At block 2102, a base station may transmit an indication that the base station supports a first radio frequency (RF) band. For example, the capability circuitry 2042 together with the communication and processing circuitry 2041 and the transceiver 2010, shown and described above in connection with FIG. 20, may provide a means to transmit an indication that the base station supports a first radio frequency (RF) band.

At block 2104, the base station may communicate with a user equipment via the first RF band according to a first configuration based on a first minimum bandwidth size defined for the first RF band, the first minimum bandwidth size being smaller than a second minimum bandwidth size defined for a second RF band available to the user equipment. For example, the configuration circuitry 2043, shown and described above in connection with FIG. 20, may provide a means to communicate with a user equipment via the first RF band according to a first configuration based on a first minimum bandwidth size defined for the first RF band.

In some examples, the first minimum bandwidth size is a first minimum bandwidth part size and the second minimum bandwidth size is a second minimum bandwidth part size. In some examples, the second minimum bandwidth part size is 5 megahertz (MHz), and the first minimum bandwidth part size is 3 MHz or 3.6 MHz.

In some examples, the first radio frequency band is at least one of a future railway mobile communication system band or a broadband services band. In some examples, the first radio frequency band is a 900 megahertz (MHz) band.

In some examples, the base station may determine that the user equipment supports the first minimum bandwidth part size. In some examples, determining that the user equipment supports the first minimum bandwidth part size may include receiving a capability message from the user equipment indicating that the user equipment supports communication on the first RF band.

In some examples, the first configuration may include a minimum number of resource blocks (RBs) for a channel state information-reference signal (CSI-RS). In some examples, communicating with the user equipment via the first RF band according to the first configuration may include transmitting the CSI-RS via at least the minimum number of RBs.

In some examples, the first configuration may include a minimum number of resource blocks (RBs) for a tracking reference signal (TRS). In some examples, communicating with the user equipment via the first RF band according to the first configuration may include transmitting the TRS via at least the minimum number of RBs.

In some examples, the first configuration specifies that transmission of a tracking reference signal (TRS) is disabled. In some examples, the method may further include determining a quasi co-location (QCL) relation for a physical downlink shared channel (PDSCH) demodulation reference signal (DMRS) based on a synchronization signal block (SSB) instead of the TRS.

In some examples, the first configuration specifies that use of at least one specified modulation and coding scheme (MCS) value is restricted. In some examples, communicating with the user equipment via the first RF band according to the first configuration may include abstaining from using the at least one specified modulation and coding scheme value when transmitting to the user equipment via the first RF band.

In some examples, the first configuration may include a first frequency hopping pattern for uplink signal transmission (e.g., PUCCH transmission, PUSCH transmission, etc.) defined for the first RF band, and the first frequency hopping pattern is different from a second frequency hopping pattern defined for the second RF band. In some examples, communicating with the user equipment via the first RF band according to the first configuration may include receiving on an uplink channel (e.g., PUCCH, PUSCH, etc.) using the first frequency hopping pattern.

In some examples, the first configuration may include a first physical uplink control channel (PUCCH) frequency hopping pattern defined for the first RF band, and the first PUCCH frequency hopping pattern is different from a second PUCCH frequency hopping pattern defined for the second RF band. In some examples, communicating with the user equipment via the first RF band according to the first configuration may include receiving on a PUCCH using the first PUCCH frequency hopping pattern.

In some examples, the first configuration specifies that frequency hopping for uplink signal transmission (e.g., PUCCH transmission, PUSCH transmission, etc.) is disabled. In some examples, communicating with the user equipment via the first RF band according to the first configuration may include abstaining from using frequency hopping when receiving on an uplink channel (e.g., PUCCH, PUSCH, etc.).

In some examples, the first configuration specifies that physical uplink control channel (PUCCH) frequency hopping is disabled. In some examples, communicating with the user equipment via the first RF band according to the first configuration may include abstaining from using frequency hopping when receiving on a PUCCH.

In some examples, the first configuration may include a first resource block (RB) offset for a physical random access channel (PRACH) occasion defined within the first RF band, and the first RB offset is different from a second RB offset of a PRACH occasion defined within the second RF band. In some examples, communicating with the user equipment via the first RF band according to the first configuration may include receiving on a PRACH using the first RB offset.

In some examples, the first configuration specifies that frequency division multiplexing (FDM) is disabled for a physical random access channel (PRACH) resource allocation. In some examples, communicating with the user equipment via the first RF band according to the first configuration may include abstaining from using frequency division multiplexed (FDMed) resources when receiving on a PRACH.

In some examples, the first configuration specifies that at least one specified physical random access channel (PRACH) format is disabled.

In some examples, the first configuration specifies that physical uplink control channel (PUCCH) frequency hopping is disabled for hybrid automatic repeat request (HARQ) feedback. In some examples, communicating with the user equipment via the first RF band according to the first configuration may include abstaining from using frequency hopping when receiving HARQ feedback.

Figure 22:
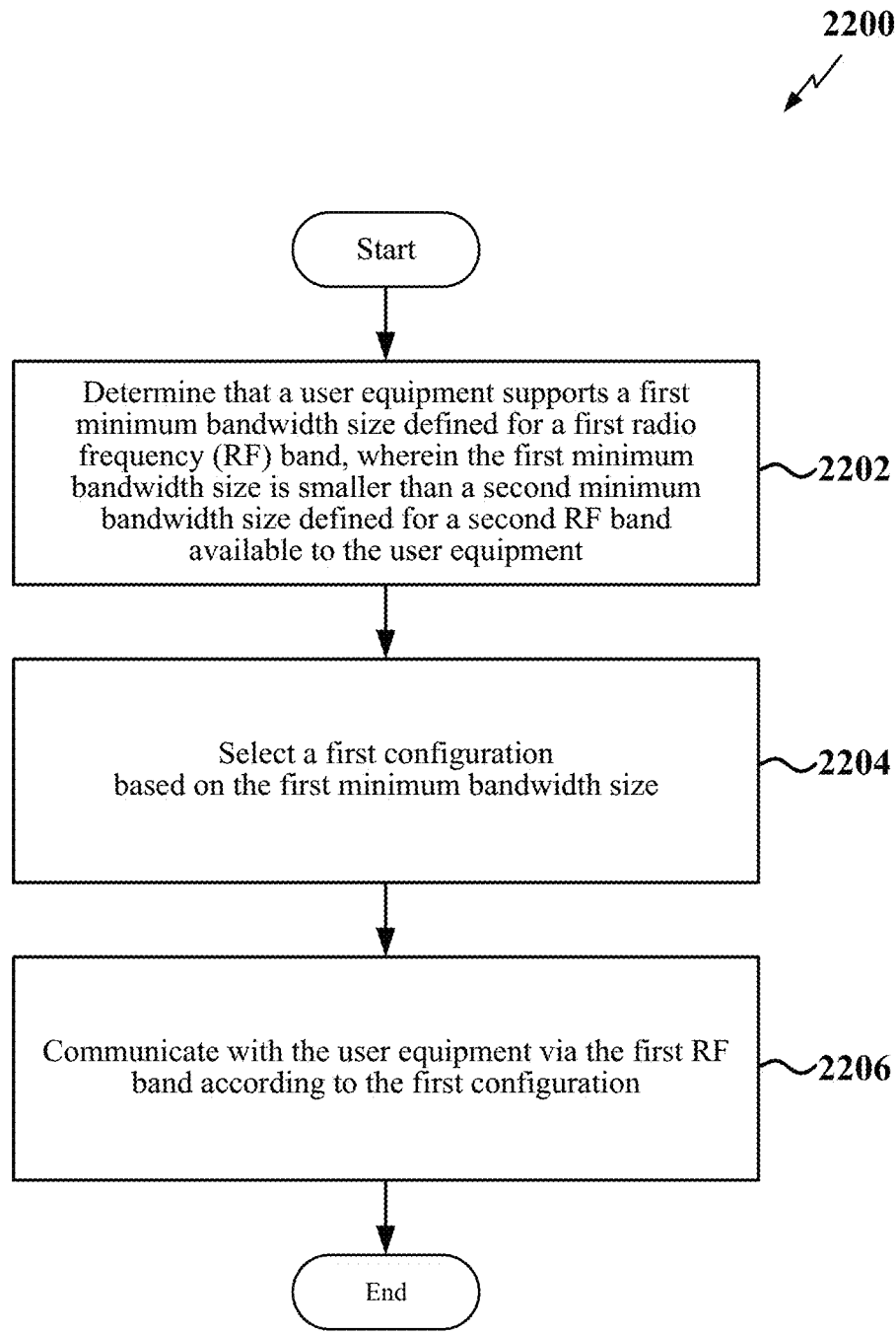
FIG. 22 is a flowchart illustrating another example method for narrowband wireless communication with a user equipment according to some aspects.

FIG. 22 is a flow chart illustrating an example method for wireless communication 2200 according to some aspects of the disclosure. As described herein, some or all illustrated features may be omitted in a particular implementation within the scope of the present disclosure, and some illustrated features may not be required for implementation of all examples. In some examples, the method for wireless communication 2200 may be carried out by the BS 2000 illustrated in FIG. 20. In some examples, the method for wireless communication 2200 may be carried out by any suitable apparatus or means for carrying out the functions or algorithm described below.

At block 2202, a base station may determine that a user equipment supports a first minimum bandwidth size defined for a first radio frequency (RF) band, wherein the first minimum bandwidth size is smaller than a second minimum bandwidth size defined for a second RF band available to the user equipment. For example, the capability circuitry 2042, shown and described above in connection with FIG. 20, may provide a means to determine that a user equipment supports a first minimum bandwidth size defined for a first radio frequency (RF) band.

In some examples, the first minimum bandwidth size is a first minimum bandwidth part size and the second minimum bandwidth size is a second minimum bandwidth part size. In some examples, the second minimum bandwidth part size is 5 megahertz (MHz), and the first minimum bandwidth part size is 3 MHz or 3.6 MHz.

In some examples, the first radio frequency band is at least one of a future railway mobile communication system band or a broadband services band. In some examples, the first radio frequency band is a 900 megahertz (MHz) band.

In some examples, determining that the user equipment supports the first minimum bandwidth part size may include receiving a capability message from the user equipment indicating that the user equipment supports communication on the first RF band.

At block 2204, the base station may select a first configuration based on the first minimum bandwidth size. For example, the configuration circuitry 2043, shown and described above in connection with FIG. 20, may provide a means to select a first configuration based on the first minimum bandwidth size.

At block 2206, the base station may communicate with the user equipment via the first RF band according to the first configuration. For example, the communication and processing circuitry 2041 and the transceiver 2010, shown and described above in connection with FIG. 20 may provide a means to communicate with the user equipment via the first RF band according to the first configuration.

In some examples, the first configuration may include a minimum number of resource blocks (RBs) for a channel state information-reference signal (CSI-RS). In some examples, communicating with the user equipment via the first RF band according to the first configuration may include transmitting the CSI-RS via at least the minimum number of RBs.

In some examples, the first configuration may include a minimum number of resource blocks (RBs) for a tracking reference signal (TRS). In some examples, communicating with the user equipment via the first RF band according to the first configuration may include transmitting the TRS via at least the minimum number of RBs.

In some examples, the first configuration specifies that transmission of a tracking reference signal (TRS) is disabled. In some examples, the method may further include determining a quasi co-location (QCL) relation for a physical downlink shared channel (PDSCH) demodulation reference signal (DMRS) based on a synchronization signal block (SSB) instead of the TRS.

In some examples, the first configuration specifies that use of at least one specified modulation and coding scheme (MCS) value is restricted. In some examples, communicating with the user equipment via the first RF band according to the first configuration may include abstaining from using the at least one specified modulation and coding scheme value when transmitting to the user equipment via the first RF band.

In some examples, the first configuration may include a first frequency hopping pattern for uplink signal transmission (e.g., PUCCH transmission, PUSCH transmission, etc.) defined for the first RF band, and the first frequency hopping pattern is different from a second frequency hopping pattern defined for the second RF band. In some examples, communicating with the user equipment via the first RF band according to the first configuration may include receiving on an uplink channel (e.g., PUCCH, PUSCH, etc.) using the first frequency hopping pattern.

In some examples, the first configuration may include a first physical uplink control channel (PUCCH) frequency hopping pattern defined for the first RF band, and the first PUCCH frequency hopping pattern is different from a second PUCCH frequency hopping pattern defined for the second RF band. In some examples, communicating with the user equipment via the first RF band according to the first configuration may include receiving on a PUCCH using the first PUCCH frequency hopping pattern.

In some examples, the first configuration specifies that frequency hopping for uplink signal transmission (e.g., PUCCH transmission, PUSCH transmission, etc.) is disabled. In some examples, communicating with the user equipment via the first RF band according to the first configuration may include abstaining from using frequency hopping when receiving on an uplink channel (e.g., PUCCH, PUSCH, etc.).

In some examples, the first configuration specifies that physical uplink control channel (PUCCH) frequency hopping is disabled. In some examples, communicating with the user equipment via the first RF band according to the first configuration may include abstaining from using frequency hopping when receiving on a PUCCH.

In some examples, the first configuration may include a first resource block (RB) offset for a physical random access channel (PRACH) occasion defined within the first RF band, and the first RB offset is different from a second RB offset of a PRACH occasion defined within the second RF band. In some examples, communicating with the user equipment via the first RF band according to the first configuration may include receiving on a PRACH using the first RB offset.

In some examples, the first configuration specifies that frequency division multiplexing (FDM) is disabled for a physical random access channel (PRACH) resource allocation. In some examples, communicating with the user equipment via the first RF band according to the first configuration may include abstaining from using frequency division multiplexed (FDMed) resources when receiving on a PRACH.

In some examples, the first configuration specifies that at least one specified physical random access channel (PRACH) format is disabled.

In some examples, the first configuration specifies that physical uplink control channel (PUCCH) frequency hopping is disabled for hybrid automatic repeat request (HARQ)

feedback. In some examples, communicating with the user equipment via the first RF band according to the first configuration may include abstaining from using frequency hopping when receiving HARQ feedback.

Figure 23:
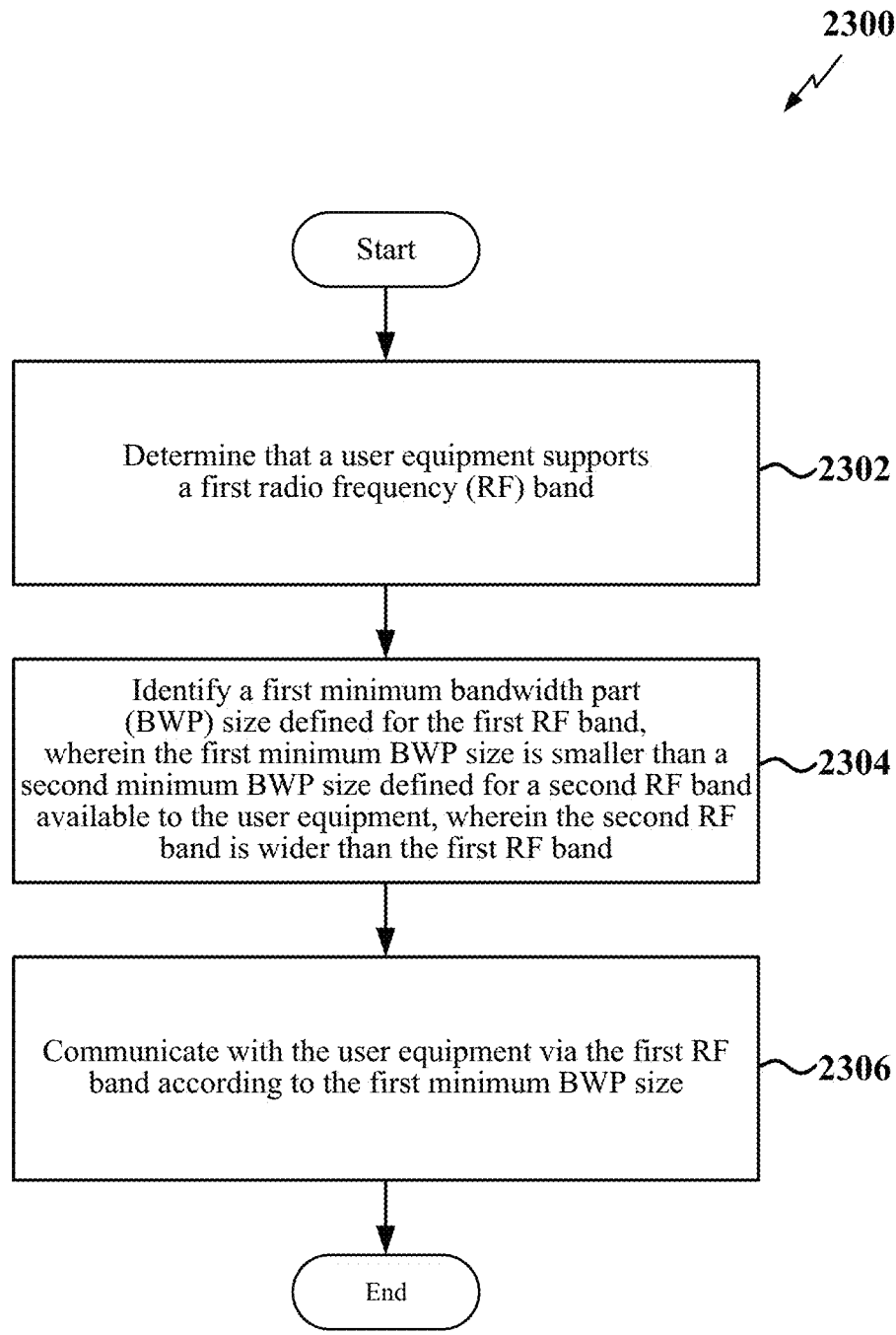
FIG. 23 is a flowchart illustrating another example method for narrowband wireless communication with a user equipment according to some aspects.

FIG. 23 is a flow chart illustrating an example method for wireless communication 2300 according to some aspects of the disclosure. As described herein, some or all illustrated features may be omitted in a particular implementation within the scope of the present disclosure, and some illustrated features may not be required for implementation of all examples. In some examples, the method for wireless communication 2300 may be carried out by the BS 2000 illustrated in FIG. 20. In some examples, the method for wireless communication 2300 may be carried out by any suitable apparatus or means for carrying out the functions or algorithm described below.

At block 2302, a base station may determine that a user equipment supports a first radio frequency (RF) band. For example, the capability circuitry 2042 together with the communication and processing circuitry 2041 and the transceiver 2010, shown and described above in connection with FIG. 20, may provide a means to determine that a user equipment supports a first radio frequency (RF) band.

At block 2304, the base station may identify a first minimum bandwidth part (BWP) size defined for the first RF band, wherein the first minimum BWP size is smaller than a second minimum BWP size defined for a second RF band available to the user equipment, wherein the second RF band is wider than the first RF band. For example, the configuration circuitry 2043, shown and described above in connection with FIG. 20, may provide a means to identify a first minimum bandwidth part (BWP) size defined for the first RF band.

At block 2306, the base station may communicate with the user equipment via the first RF band according to the first minimum BWP size. For example, the communication and processing circuitry 2041 and the transceiver 2010, shown and described above in connection with FIG. 20 may provide a means to communicate with the user equipment via the first RF band according to the first minimum BWP size.

In some examples, the first minimum BWP size is a minimum uplink BWP size. In some examples, communicating with the user equipment via the first RF band according to the first minimum BWP size may include receiving information from the user equipment using at least the minimum uplink BWP size.

In some examples, the first minimum BWP size is a minimum downlink BWP size. In some examples, communicating with the user equipment via the first RF band according to the first minimum BWP size may include transmitting information to the user equipment using at least the minimum downlink BWP size.

In some examples, a base station includes a transceiver, a memory, and a processor coupled to the transceiver and the memory. The processor and the memory may be configured to determine that a user equipment supports a first minimum bandwidth size defined for a first radio frequency (RF) band. The first minimum bandwidth size is smaller than a second minimum bandwidth size defined for a second RF band available to the user equipment. The processor and the memory may also be configured to select a first configuration based on the first minimum bandwidth size and communicate with the user equipment via the first RF band according to the first configuration.

In some examples, a method for wireless communication at a base station may include determining that a user equipment supports a first minimum bandwidth size defined for a first radio frequency (RF) band. The first minimum bandwidth size is smaller than a second minimum bandwidth size defined for a second RF band available to the user equipment. The method may also include selecting a first configuration based on the first minimum bandwidth size and communicating with the user equipment via the first RF band according to the first configuration.

In some examples, a base station may include means for determining that a user equipment supports a first minimum bandwidth size defined for a first radio frequency (RF) band. The first minimum bandwidth size is smaller than a second minimum bandwidth size defined for a second RF band available to the user equipment. The base station may also include means for selecting a first configuration based on the first minimum bandwidth size and means for communicating with the user equipment via the first RF band according to the first configuration.

In some examples, an article of manufacture for use by a base station may include a computer-readable medium having stored therein instructions executable by one or more processors of the base station to determine that a user equipment supports a first minimum bandwidth size defined for a first radio frequency (RF) band. The first minimum bandwidth size is smaller than a second minimum bandwidth size defined for a second RF band available to the user equipment. The computer-readable medium may also have stored therein instructions executable by one or more processors of the base station to select a first configuration based on the first minimum bandwidth size and communicate with the user equipment via the first RF band according to the first configuration.

In some examples, a base station includes a transceiver, a memory, and a processor coupled to the transceiver and the memory. The processor and the memory may be configured to determine that a user equipment supports a first radio frequency (RF) band and identify a first minimum bandwidth part (BWP) size defined for the first RF band. The first minimum BWP size is smaller than a second minimum BWP size defined for a second RF band available to the user equipment. The second RF band is wider than the first RF band. The processor and the memory may be further configured to communicate with the user equipment via the first RF band according to the first minimum BWP size.

In some examples, a method for wireless communication at a base station may include determining that a user equipment supports a first radio frequency (RF) band and identifying a first minimum bandwidth part (BWP) size defined for the first RF band. The first minimum BWP size is smaller than a second minimum BWP size defined for a second RF band available to the user equipment. The second RF band is wider than the first RF band. The method may also include communicating with the user equipment via the first RF band according to the first minimum BWP size.

In some examples, a base station may include means for determining that a user equipment supports a first radio frequency (RF) band and identifying a first minimum bandwidth part (BWP) size defined for the first RF band. The first minimum BWP size is smaller than a second minimum BWP size defined for a second RF band available to the user equipment. The second RF band is wider than the first RF band. The base station may also include means for communicating with the user equipment via the first RF band according to the first minimum BWP size.

In some examples, an article of manufacture for use by a base station may include a computer-readable medium having stored therein instructions executable by one or more processors of the base station to determine that a user equipment supports a first radio frequency (RF) band and identify a first minimum bandwidth part (BWP) size defined for the first RF band. The first minimum BWP size is smaller than a second minimum BWP size defined for a second RF band available to the user equipment. The second RF band is wider than the first RF band. The computer-readable medium may also have stored therein instructions executable by one or more processors of the base station to communicate with the user equipment via the first RF band according to the first minimum BWP size.

In one configuration, the base station 2000 includes means for transmitting an indication that the base station supports a first radio frequency (RF) band, and means for communicating with a user equipment via the first RF band according to a first configuration based on a first minimum bandwidth size defined for the first RF band, the first minimum bandwidth size being smaller than a second minimum bandwidth size defined for a second RF band available to the user equipment. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any one or more of FIGS. 1, 2, 5, and 20, and utilizing, for example, the methods and/or algorithms described herein in relation to FIGS. 21-23.

The methods shown in FIGS. 17-19 and 21-23 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving an indication that a base station supports a first radio frequency (RF) band; and communicating with the base station via the first RF band according to a first configuration based on a first minimum bandwidth size defined for the first RF band, the first minimum bandwidth size being smaller than a second minimum bandwidth size defined for a second RF band available to the user equipment.

Aspect 2: The method of aspect 1, wherein: the first minimum bandwidth size is a first minimum bandwidth part size; and the second minimum bandwidth size is a second minimum bandwidth part size.

Aspect 3: The method of aspect 2, wherein: the second minimum bandwidth part size is 5 megahertz (MHz); and the first minimum bandwidth part size is 3 MHz or 3.6 MHz.

Aspect 4: The method of any of aspects 1 through 3, wherein the first configuration comprises a minimum number of resource blocks (RB s) for a channel state information-reference signal (CSI-RS).

Aspect 5: The method of aspect 4, wherein the communicating with the base station via the first RF band according to the first configuration comprises receiving the CSI-RS via at least the minimum number of RBs.

Aspect 6: The method of any of aspects 1 through 5, wherein the first configuration comprises a minimum number of resource blocks (RBs) for a tracking reference signal (TRS).

Aspect 7: The method of aspect 6, wherein the communicating with the base station via the first RF band according to the first configuration comprises receiving the TRS via at least the minimum number of RBs.

Aspect 8: The method of any of aspects 1 through 5, wherein the first configuration specifies that transmission of a tracking reference signal (TRS) is disabled.

Aspect 9: The method of aspect 8, further comprising: determining a quasi co-location (QCL) relation for a physical downlink shared channel (PDSCH) demodulation reference signal (DMRS) based on a synchronization signal block (SSB) instead of the TRS.

Aspect 10: The method of any of aspects 1 through 9, wherein the first configuration specifies that use of at least one specified modulation and coding scheme (MCS) value is restricted.

Aspect 11: The method of aspect 10, wherein the communicating with the base station via the first RF band according to the first configuration comprises abstaining from using the at least one specified modulation and coding scheme value when communicating with the base station via the first RF band.

Aspect 12: The method of any of aspects 1 through 11, wherein: the first configuration comprises a first frequency hopping pattern for uplink signal transmission defined for the first RF band; and the first frequency hopping pattern is different from a second frequency hopping pattern defined for the second RF band.

Aspect 13: The method of aspect 12, wherein the communicating with the base station via the first RF band according to the first configuration comprises transmitting on an uplink channel using the first frequency hopping pattern.

Aspect 14: The method of any of aspects 1 through 11, wherein the first configuration specifies that frequency hopping for uplink signal transmission is disabled.

Aspect 15: The method of aspect 14, wherein the communicating with the base station via the first RF band according to the first configuration comprises abstaining from using frequency hopping when transmitting on an uplink channel.

Aspect 16: The method of any of aspects 1 through 15, wherein: the first configuration comprises a first resource block (RB) offset for a first physical random access channel (PRACH) occasion defined within the first RF band; and the first RB offset is different from a second RB offset of a second PRACH occasion defined within the second RF band.

Aspect 17: The method of aspect 16, wherein the communicating with the base station via the first RF band according to the first configuration comprises transmitting on a PRACH using the first RB offset.

Aspect 18: The method of any of aspects 1 through 17, wherein the first configuration specifies that frequency division multiplexing (FDM) is disabled for a physical random access channel (PRACH) resource allocation.

Aspect 19: The method of aspect 18, wherein the communicating with the base station via the first RF band according to the first configuration comprises abstaining from using frequency division multiplexed resources when transmitting on a PRACH.

Aspect 20: The method of any of aspects 1 through 19, wherein the first configuration specifies that at least one specified physical random access channel (PRACH) format is disabled.

Aspect 21: The method of aspect 20, wherein the communicating with the base station via the first RF band according to the first configuration comprises abstaining from using the at least one specified PRACH format when transmitting on a PRACH.

Aspect 22: The method of any of aspects 1 through 21, wherein the first configuration specifies that physical uplink control channel (PUCCH) frequency hopping is disabled for hybrid automatic repeat request (HARQ) feedback.

Aspect 23: The method of aspect 22, wherein the communicating with the base station via the first RF band according to the first configuration comprises abstaining from using frequency hopping when transmitting HARQ feedback.

Aspect 24: The method of any of aspects 1 through 23, further comprising:
transmitting a capability message indicating that the user equipment supports communication on the first RF band.

Aspect 25: The method of any of aspects 1 through 24, wherein the first radio frequency band is at least one of a future railway mobile communication system band or a broadband services band.

Aspect 26: The method of any of aspects 1 through 25, wherein the first radio frequency band is a 900 megahertz (MHz) band.

Aspect 27: A user equipment (UE) comprising: a transceiver, a memory, and a processor coupled to the transceiver and the memory, wherein the processor and the memory are configured to perform any one of aspects 1 through 26.

Aspect 28: An apparatus configured for wireless communication comprising at least one means for performing any one of aspects 1 through 26.

Aspect 29: A non-transitory computer-readable medium storing computer-executable code, comprising code for causing an apparatus to perform any one of aspects 1 through 26.

Aspect 51: A method for wireless communication at a base station, the method comprising: transmitting an indication that the base station supports a first radio frequency (RF) band; and communicating with a user equipment via the first RF band according to a first configuration based on a first minimum bandwidth size defined for the first RF band, the first minimum bandwidth size being smaller than a second minimum bandwidth size defined for a second RF band available to the user equipment.

Aspect 52: The method of aspect 51, wherein: the first minimum bandwidth size is a first minimum bandwidth part size; and the second minimum bandwidth size is a second minimum bandwidth part size.

Aspect 53: The method of aspect 52, wherein: the second minimum bandwidth part size is 5 megahertz (MHz); and the first minimum bandwidth part size is 3 MHz or 3.6 MHz.

Aspect 54: The method of any of aspects 51 through 53, wherein the first configuration comprises a minimum number of resource blocks (RBs) for a channel state information-reference signal (CSI-RS).

Aspect 55: The method of aspect 54, wherein the communicating with the user equipment via the first RF band according to the first configuration comprises transmitting the CSI-RS via at least the minimum number of RBs.

Aspect 56: The method of any of aspects 51 through 55, wherein the first configuration comprises a minimum number of resource blocks (RBs) for a tracking reference signal (TRS).

Aspect 57: The method of aspect 56, wherein the communicating with the user equipment via the first RF band according to the first configuration comprises transmitting the TRS via at least the minimum number of RBs.

Aspect 58: The method of any of aspects 51 through 55, wherein the first configuration specifies that transmission of a tracking reference signal (TRS) is disabled.

Aspect 59: The method of aspect 58, further comprising: determining a quasi co-location (QCL) relation for a physical downlink shared channel (PDSCH) demodulation reference signal (DMRS) based on a synchronization signal block (SSB) instead of the TRS.

Aspect 60: The method of any of aspects 51 through 59, wherein the first configuration specifies that use of at least one specified modulation and coding scheme (MCS) value is restricted.

Aspect 61: The method of aspect 60, wherein the communicating with the user equipment via the first RF band according to the first configuration comprises abstaining from using the at least one specified modulation and coding scheme value when transmitting to the user equipment via the first RF band.

Aspect 62: The method of any of aspects 51 through 61, wherein: the first configuration comprises a first frequency hopping pattern for uplink signal transmission defined for the first RF band; and the first frequency hopping pattern is different from a second frequency hopping pattern defined for the second RF band.

Aspect 63: The method of aspect 62, wherein the communicating with the user equipment via the first RF band according to the first configuration comprises receiving on an uplink channel using the first frequency hopping pattern.

Aspect 64: The method of any of aspects 51 through 61, wherein the first configuration specifies that frequency hopping for uplink signal transmission is disabled.

Aspect 65: The method of aspect 64, wherein the communicating with the user equipment via the first RF band according to the first configuration comprises abstaining from using frequency hopping when receiving on an uplink channel.

Aspect 66: The method of any of aspects 51 through 65, wherein: the first configuration comprises a first resource block (RB) offset for a first physical random access channel (PRACH) occasion defined within the first RF band; and the first RB offset is different from a second RB offset of a second PRACH occasion defined within the second RF band.

Aspect 67: The method of aspect 66, wherein the communicating with the user equipment via the first RF band according to the first configuration comprises receiving on a PRACH using the first RB offset.

Aspect 68: The method of any of aspects 51 through 67, wherein the first configuration specifies that frequency division multiplexing (FDM) is disabled for a physical random access channel (PRACH) resource allocation.

Aspect 69: The method of aspect 68, wherein the communicating with the user equipment via the first RF band according to the first configuration comprises abstaining from using frequency division multiplexed resources when receiving on a PRACH.

Aspect 70: The method of any of aspects 51 through 69, wherein the first configuration specifies that at least one specified physical random access channel (PRACH) format is disabled.

Aspect 71: The method of any of aspects 51 through 70, wherein the first configuration specifies that physical uplink control channel (PUCCH) frequency hopping is disabled for hybrid automatic repeat request (HARQ) feedback.

Aspect 72: The method of aspect 71, wherein the communicating with the user equipment via the first RF band according to the first configuration comprises abstaining from using frequency hopping when receiving HARQ feedback.

Aspect 73: The method of any of aspects 51 through 72, further comprising receiving a capability message from the user equipment indicating that the user equipment supports communication on the first RF band.

Aspect 74: The method of any of aspects 51 through 73, wherein the first radio frequency band is future railway mobile communication system band or a broadband services band.

Aspect 75: The method of any of aspects 51 through 74, wherein the first radio frequency band is a 900 megahertz (MHz) band.

Aspect 76: A base station (BS) comprising: a transceiver, a memory, and a processor coupled to the transceiver and the memory, wherein the processor and the memory are configured to perform any one of aspects 51 through 75.

Aspect 77: An apparatus configured for wireless communication comprising at least one means for performing any one of aspects 51 through 75.

Aspect 78: A non-transitory computer-readable medium storing computer-executable code, comprising code for causing an apparatus to perform any one of aspects 51 through 75.

Aspect 101: A method for wireless communication at a user equipment, the method comprising: identifying a first radio frequency (RF) band supported by a base station; identifying a first minimum bandwidth part (BWP) size defined for the first RF band, wherein the first minimum BWP size is smaller than a second minimum BWP size defined for a second RF band available to the user equipment, wherein the second RF band is wider than the first RF band; and communicating with the base station via the first RF band according to the first minimum BWP size.

Aspect 102: The method of aspect 101, wherein the first minimum BWP size is a minimum uplink BWP size.

Aspect 103: The method of aspect 102, wherein the communicating with the base station via the first RF band according to the first minimum BWP size comprises transmitting information to the base station using at least the minimum uplink BWP size.

Aspect 104: The method of any of aspects 101 through 103, wherein the first minimum BWP size is a minimum downlink BWP size.

Aspect 105: The method of aspect 104, wherein the communicating with the base station via the first RF band according to the first minimum BWP size comprises receiving information from the base station using at least the minimum downlink BWP size.

Aspect 106: A user equipment (UE) comprising: a transceiver, a memory, and a processor coupled to the transceiver and the memory, wherein the processor and the memory are configured to perform any one of aspects 101 through 105.

Aspect 107: An apparatus configured for wireless communication comprising at least one means for performing any one of aspects 101 through 105.

Aspect 108: A non-transitory computer-readable medium storing computer-executable code, comprising code for causing an apparatus to perform any one of aspects 101 through 105.

Aspect 113: A method for wireless communication at a base station, the method comprising: determining that a user equipment supports a first radio frequency (RF) band; identifying a first minimum bandwidth part (BWP) size defined for the first RF band, wherein the first minimum BWP size is smaller than a second minimum BWP size defined for a second RF band available to the user equipment, wherein the second RF band is wider than the first RF band; and communicating with the user equipment via the first RF band according to the first minimum BWP size.

Aspect 114: The method of aspect 113, wherein the first minimum BWP size is a minimum uplink BWP size.

Aspect 115: The method of aspect 114, wherein the communicating with the user equipment via the first RF band according to the first minimum BWP size comprises receiving information from the user equipment using at least the minimum uplink BWP size.

Aspect 116: The method of any of aspects 113 through 115, wherein the first minimum BWP size is a minimum downlink BWP size.

Aspect 117: The method of aspect 116, wherein the communicating with the user equipment via the first RF band according to the first minimum BWP size comprises transmitting information to the user equipment using at least the minimum downlink BWP size.

Aspect 118: A base station (BS) comprising: a transceiver, a memory, and a processor coupled to the transceiver and the memory, wherein the processor and the memory are configured to perform any one of aspects 113 through 117.

Aspect 119: An apparatus configured for wireless communication comprising at least one means for performing any one of aspects 113 through 117.

Aspect 120: A non-transitory computer-readable medium storing computer-executable code, comprising code for causing an apparatus to perform any one of aspects 113 through 117.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 16 and 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment, comprising:
a transceiver;
one or more memories storing processor-executable code; and
one or more processors configured to execute the processor-executable code and cause the user equipment to:
communicate, via the transceiver, with a network entity via a first radio frequency (RF) band according to a first configuration that specifies a first size of a first nominal bandwidth part (BWP) for the first RF band;
receive, via the transceiver, an indication that the network entity supports a second RF band that has a narrower bandwidth than the first RF band;
transmit, via the transceiver, a capability message indicating that the user equipment supports communication on the second RF band;
receive, via the transceiver, a second configuration that specifies a second size of a second nominal BWP for the second RF band, the second size being equal to the first size, the second configuration further specifying a first minimum size of a third BWP for channel state information-reference signal (CSI-RS) transmissions on the second RF band, the first minimum size of the third BWP for the CSI-RS transmissions on the second RF band being narrower than the second size of the second nominal BWP for the second RF band; and
receive a first CSI-RS, via the transceiver, from the network entity via the second RF band according to the second configuration that specifies the first minimum size of the third BWP for the CSI-RS transmissions on the second RF band.

2. The user equipment of claim 1, wherein:
the first size is 5 megahertz (MHz); and
the first minimum size is 3 MHz or 3.6 MHz.

3. The user equipment of claim 1, wherein:
the second configuration comprises a minimum number of resource blocks (RBs) for the CSI-RS transmissions on the second RF band; and
the one or more processors are further configured to execute the processor-executable code and cause the user equipment to receive the first CSI-RS via at least the minimum number of RBs.

4. The user equipment of claim 1, wherein:
the second configuration comprises a minimum number of resource blocks (RBs) for a tracking reference signal (TRS); and
the one or more processors are further configured to execute the processor-executable code and cause the user equipment to receive the TRS via at least the minimum number of RBs.

5. The user equipment of claim 1, wherein:
the second configuration specifies that transmission of a tracking reference signal (TRS) is disabled; and
the one or more processors are further configured to execute the processor-executable code and cause the user equipment to determine a quasi co-location (QCL) relation for a physical downlink shared channel (PDSCH) demodulation reference signal (DMRS) based on a synchronization signal block (SSB) instead of the TRS.

6. The user equipment of claim 1, wherein:
the second configuration specifies that use of at least one specified modulation and coding scheme value is restricted; and
the one or more processors are further configured to execute the processor-executable code and cause the user equipment to abstain from using the at least one specified modulation and coding scheme value when communicating with the network entity via the second RF band.

7. The user equipment of claim 1, wherein:
the second configuration comprises a first frequency hopping pattern for uplink signal transmission defined for the second RF band;
the first frequency hopping pattern is different from a second frequency hopping pattern defined for the first RF band; and
the one or more processors are further configured to execute the processor-executable code and cause the user equipment to transmit on an uplink channel using the first frequency hopping pattern.

8. The user equipment of claim 1, wherein:
the second configuration specifies that frequency hopping for uplink signal transmission is disabled; and
the one or more processors are further configured to execute the processor-executable code and cause the user equipment to abstain from using frequency hopping when transmitting on an uplink channel.

9. The user equipment of claim 1, wherein:
the second configuration comprises a first resource block (RB) offset for a first physical random access channel (PRACH) occasion defined within the second RF band;
the first RB offset is different from a second RB offset of a second PRACH occasion defined within the first RF band; and
the one or more processors are further configured to execute the processor-executable code and cause the user equipment to transmit on a PRACH using the first RB offset.

10. The user equipment of claim 1, wherein:
the second configuration specifies that frequency division multiplexing (FDM) is disabled for a physical random access channel (PRACH) resource allocation; and
the one or more processors are further configured to execute the processor-executable code and cause the user equipment to abstain from using frequency division multiplexed resources when transmitting on a PRACH.

11. The user equipment of claim 1, wherein:
the second configuration specifies that at least one specified physical random access channel (PRACH) format is disabled; and
the one or more processors are further configured to execute the processor-executable code and cause the user equipment to abstain from using the at least one specified PRACH format when transmitting on a PRACH.

12. The user equipment of claim 1, wherein:
the second configuration specifies that physical uplink control channel (PUCCH) frequency hopping is disabled for hybrid automatic repeat request (HARQ) feedback; and
the one or more processors are further configured to execute the processor-executable code and cause the user equipment to abstain from using frequency hopping when transmitting HARQ feedback.

13. The user equipment of claim 1, wherein the first radio frequency band is future railway mobile communication system band or a broadband services band.

14. The user equipment of claim 1, wherein the first radio frequency band is a 900 megahertz (MHz) band.

15. The user equipment of claim 1, wherein:
the first configuration specifies a second minimum size of a fourth BWP for CSI-RS transmissions on the first RF band; and
the second minimum size of the fourth BWP for the CSI-RS transmissions on the first RF band is different from the first minimum size of the third BWP for the CSI-RS transmissions on the second RF band.

16. A method for wireless communication at a user equipment, the method comprising:
communicating with a network entity via a first radio frequency (RF) band according to a first configuration that specifies a first size of a first nominal bandwidth part (BWP) for the first RF band;
receiving an indication that the network entity supports a second RF band that has a narrower bandwidth than the first RF band;
transmitting a capability message indicating that the user equipment supports communication on the second RF band;
receiving a second configuration that specifies a second size of a second nominal BWP for the second RF band, the second size being equal to the first size, the second configuration further specifying a first minimum size of a third BWP for channel state information-reference signal (CSI-RS) transmissions on the second RF band, the first minimum size of the third BWP for the CSI-RS transmissions on the second RF band being narrower than the second size of the second nominal BWP for the second RF band; and
receiving a first CSI-RS from the network entity via the second RF band according to the second configuration that specifies the first minimum size of the third BWP for the CSI-RS transmissions on the second RF band.

17. A network entity, comprising:
a transceiver;
one or more memories storing processor-executable code; and
one or more processors configured to execute the processor-executable code and cause the network entity to:
communicate, via the transceiver, with a user equipment via a first radio frequency (RF) band according to a first configuration that that specifies a first size of a first nominal bandwidth part (BWP) for the first RF band;
transmit, via the transceiver, an indication that the network entity supports a second RF band that has a narrower bandwidth than the first RF band;
receive, via the transceiver, a capability message indicating that the user equipment supports communication on the second RF band;
transmit to the user equipment, via the transceiver, a second configuration that specifies a second size of a second nominal BWP for the second RF band, the second size being equal to the first size, the second configuration further specifying a first minimum size of a third BWP for channel state information-reference signal (CSI-RS) transmissions on the second RF band, the first minimum size of the third BWP for the CSI-RS transmissions on the second RF band being narrower than the second size of the second nominal BWP for the second RF band; and transmit a first CSI-RS, via the transceiver, to the user equipment via the second RF band according to the second configuration that specifies the first minimum size of the third BWP for the CSI-RS transmissions on the second RF band.

18. The network entity of claim 17, wherein:
the second configuration comprises a minimum number of resource blocks (RBs) for the CSI-RS transmissions on the second RF band; and
the one or more processors are further configured to execute the processor-executable code and cause the network entity to transmit the first CSI-RS via at least the minimum number of RBs.

19. The network entity of claim 17, wherein:
the second configuration comprises a minimum number of resource blocks (RBs) for a tracking reference signal (TRS); and
the one or more processors are further configured to execute the processor-executable code and cause the network entity to transmit the TRS via at least the minimum number of RBs.

20. The network entity of claim 17, wherein:
the second configuration specifies that transmission of a tracking reference signal (TRS) is disabled; and
the one or more processors are further configured to execute the processor-executable code and cause the network entity to determine a quasi co-location (QCL) relation for a physical downlink shared channel (PDSCH) demodulation reference signal (DMRS) based on a synchronization signal block (SSB) instead of the TRS.

21. The network entity of claim 17, wherein:
the second configuration specifies that use of at least one specified modulation and coding scheme value is restricted; and
the one or more processors are further configured to execute the processor-executable code and cause the network entity to abstain from using the at least one specified modulation and coding scheme value when transmitting to the user equipment via the second RF band.

22. The network entity of claim 17, wherein:
the second configuration comprises a first frequency hopping pattern for uplink signal transmission defined for the second RF band;
the first frequency hopping pattern is different from a second frequency hopping pattern defined for the first RF band; and
the one or more processors are further configured to execute the processor-executable code and cause the network entity to receive on an uplink channel using the first frequency hopping pattern.

23. The network entity of claim 17, wherein:
the second configuration specifies that frequency hopping for uplink signal transmission is disabled; and
the one or more processors are further configured to execute the processor-executable code and cause the network entity to abstain from using frequency hopping when receiving on an uplink channel.

24. The network entity of claim 17, wherein:
the second configuration comprises a first resource block (RB) offset for a first physical random access channel (PRACH) occasion defined within the second RF band;

the first RB offset is different from a second RB offset of a second PRACH occasion defined within the first RF band; and
the one or more processors are further configured to execute the processor-executable code and cause the network entity to receive on a PRACH using the first RB offset.

25. The network entity of claim 17, wherein:
the second configuration specifies that frequency division multiplexing (FDM) is disabled for a physical random access channel (PRACH) resource allocation; and
the one or more processors are further configured to execute the processor-executable code and cause the network entity to abstain from using frequency division multiplexed resources when receiving on a PRACH.

26. The network entity of claim 17, wherein the second configuration specifies that at least one specified physical random access channel (PRACH) format is disabled.

27. The network entity of claim 17, wherein:
the second configuration specifies that physical uplink control channel (PUCCH) frequency hopping is disabled for hybrid automatic repeat request (HARQ) feedback; and
the one or more processors are further configured to execute the processor-executable code and cause the network entity to abstain from using frequency hopping when receiving HARQ feedback.

28. The network entity of claim 17, wherein:
the first configuration specifies a second minimum size of a fourth BWP for CSI-RS transmissions on the first RF band; and
the second minimum size of the fourth BWP for the CSI-RS transmissions on the first RF band is different from the first minimum size of the third BWP for the CSI-RS transmissions on the second RF band.

29. A method for wireless communication at a network entity, the method comprising:
communicating with a user equipment via a first radio frequency (RF) band according to a first configuration that specifies a first size of a first nominal bandwidth part (BWP) for the first RF band;
transmitting an indication that the network entity supports a second RF band that has a narrower bandwidth than the first RF band;
receiving a capability message indicating that the user equipment supports communication on the second RF band;
transmitting to the user equipment a second configuration that specifies a second size of a second nominal BWP for the second RF band, the second size being equal to the first size, the second configuration further specifying and a first minimum size of a third BWP for channel state information-reference signal (CSI-RS) transmissions on the second RF band, the first minimum size of the third BWP for the CSI-RS transmissions on the second RF band being narrower than the second size of the second first nominal BWP-size for the second RF band; and
transmitting a first CSI-RS to the user equipment via the second RF band according to the second configuration that specifies the first minimum size of the third BWP for the CSI-RS transmissions on the second RF band.

* * * * *